United States Patent
Nakanishi et al.

(10) Patent No.: US 7,911,774 B2
(45) Date of Patent: Mar. 22, 2011

(54) METAL FRAME FOR ELECTRO-OPTICAL DEVICE HAVING A FOLDING PORTION AND A SEAMLESS CURVED SHAPE

(75) Inventors: Daisuke Nakanishi, Matsumoto (JP); Yasunori Onishi, Azumino (JP); Naruo Hashino, Tottori (JP)

(73) Assignee: Epson Imaging Devices Corporation (JP)

( * ) Notice: Subject to any disclaimer, the term of this patent is extended or adjusted under 35 U.S.C. 154(b) by 287 days.

(21) Appl. No.: 12/146,655

(22) Filed: Jun. 26, 2008

(65) Prior Publication Data

US 2009/0004408 A1    Jan. 1, 2009

(30) Foreign Application Priority Data

Jun. 28, 2007 (JP) ................... 2007-170075
May 13, 2008 (JP) ................... 2008-126289

(51) Int. Cl.
*G06F 1/16* (2006.01)
(52) U.S. Cl. ............... 361/679.21; 361/679.55; 349/58; 29/592.1
(58) Field of Classification Search .............. None
See application file for complete search history.

(56) References Cited

U.S. PATENT DOCUMENTS

| | | | |
|---|---|---|---|
| 4,381,842 A | 5/1983 | Dezawa | |
| 4,852,736 A * | 8/1989 | Kojima et al. | 235/1 D |
| 5,737,043 A * | 4/1998 | Takaya | 349/58 |
| 6,801,268 B2 * | 10/2004 | Huang et al. | 349/58 |
| 6,977,694 B2 * | 12/2005 | Natsuyama | 349/60 |
| 7,081,940 B2 * | 7/2006 | Suzuki | 349/153 |
| 7,688,574 B2 * | 3/2010 | Zadesky et al. | 361/679.21 |
| 2005/0094054 A1 * | 5/2005 | You et al. | 349/58 |
| 2006/0119760 A1 | 6/2006 | Okuda | |
| 2006/0139793 A1 * | 6/2006 | Ser et al. | 360/97.01 |
| 2008/0165485 A1 * | 7/2008 | Zadesky et al. | 361/683 |
| 2009/0103001 A1 * | 4/2009 | Choi | 349/58 |
| 2009/0168318 A1 * | 7/2009 | Moon et al. | 361/679.21 |

FOREIGN PATENT DOCUMENTS

| | | |
|---|---|---|
| JP | 56-015107 | 2/1981 |
| JP | 06-136910 | 5/1994 |
| JP | 11-222964 | 8/1999 |
| JP | 2000-013931 | 1/2000 |
| JP | 2004-240239 | 8/2004 |
| JP | 2006-154401 | 6/2006 |
| TW | 345268 | 4/1986 |

* cited by examiner

*Primary Examiner* — Jayprakash N Gandhi
*Assistant Examiner* — Anthony Q Edwards
(74) *Attorney, Agent, or Firm* — Harness, Dickey & Pierce, P.L.C.

(57) ABSTRACT

An electro-optical device is provided which includes an electro-optical panel; and a metal frame configured to accommodate the electro-optical panel therein. The metal frame includes a plurality of side walls and corner portions provided between the side walls. A distal end of at least a portion of at least one of the side walls has a folding portion having a structure that inner surfaces are opposed to each other. At least one of the corner portions adjacent to the side wall having the folding portion has a seamless curved shape.

8 Claims, 15 Drawing Sheets (METAL FRAME FORMING METHOD)

FIG. 5A
FIG. 5B
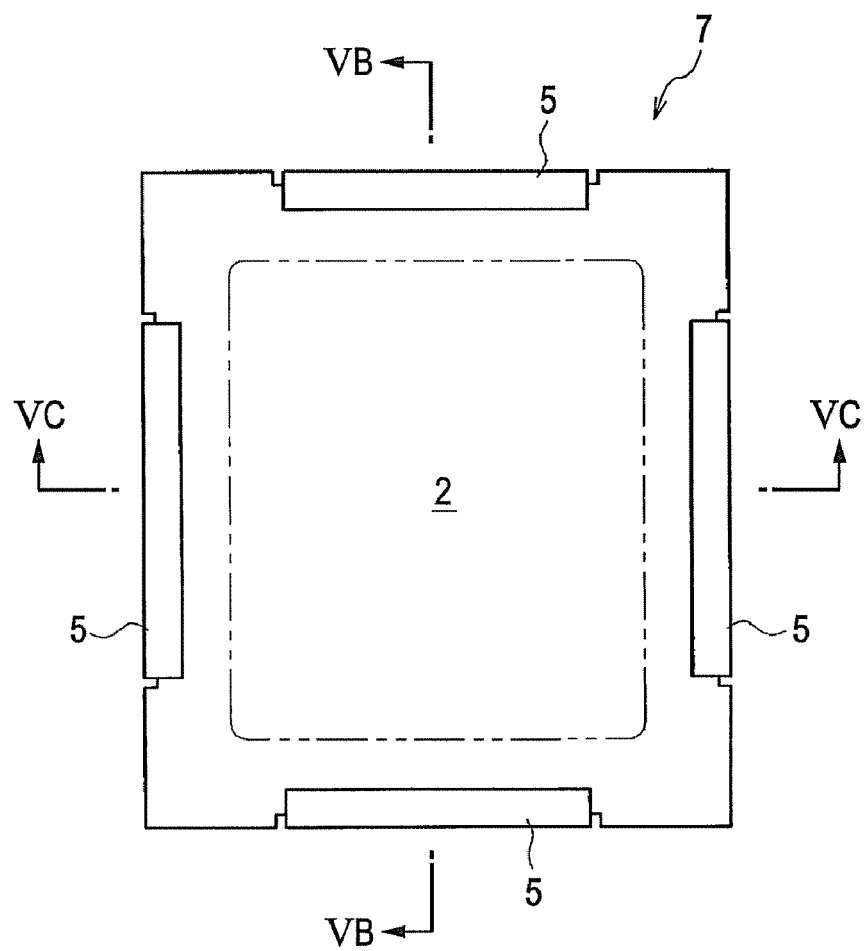
FIG. 5C
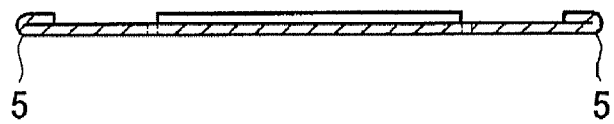

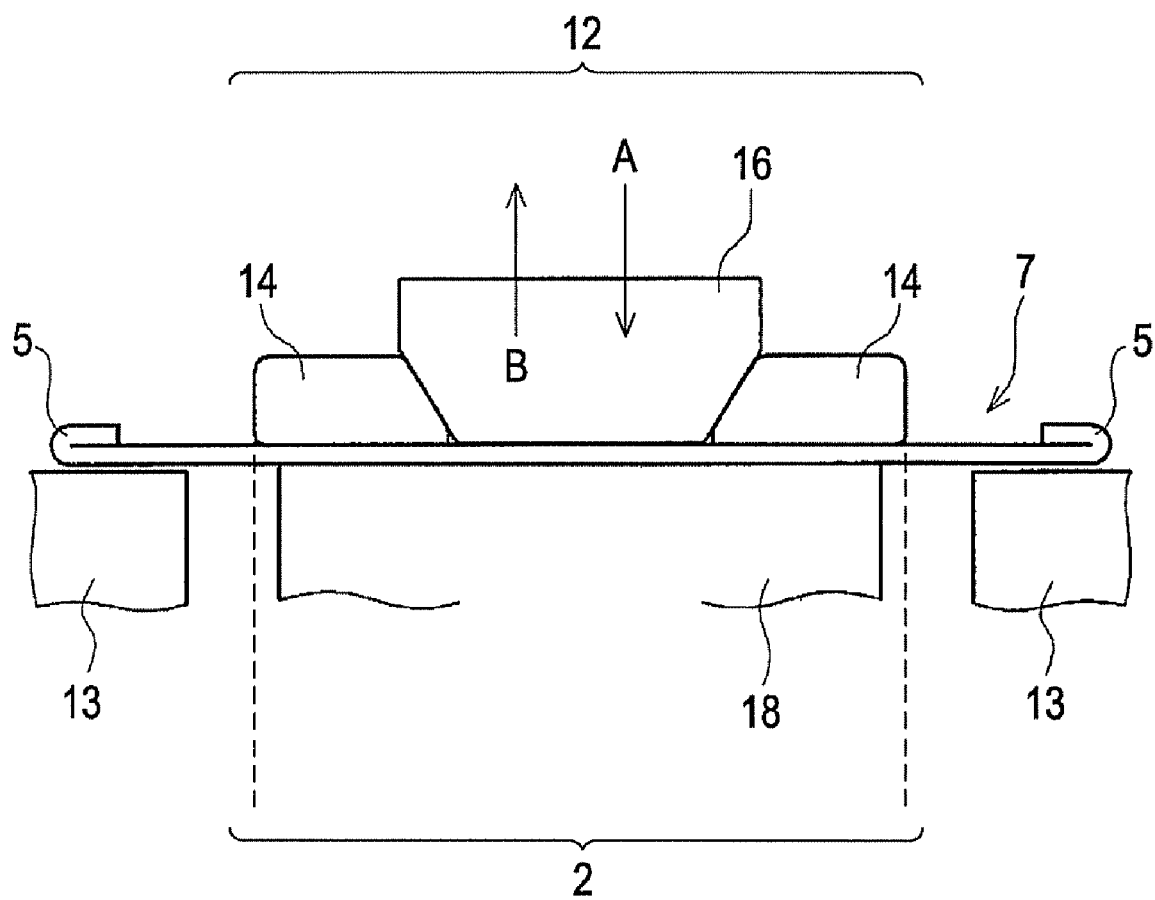

(MANUFACTURING METHOD OF ELECTRO-OPTICAL DEVICE)

METAL FRAME FOR ELECTRO-OPTICAL DEVICE HAVING A FOLDING PORTION AND A SEAMLESS CURVED SHAPE

BACKGROUND

1. Technical Field

The present invention relates to an electro-optical device, a metal frame for electro-optical device, a manufacturing method of an electro-optical device, a manufacturing method of a metal frame for electro-optical device, and an electronic apparatus 2. Related Art In the past, as an electro-optical device manufactured using a metal frame, a display apparatus is known (for example, see page 4 and FIG. 2 of JP-A-2004-240239). In the display apparatus, a display panel is accommodated in the metal frame via a resin frame. The metal frame has its side surfaces that are usually folded vertical to a bottom surface in order to increase its strength against external load.

In technical fields other than the display apparatus, the following technologies are known as a structure for reinforcing a box-shaped metal body. In page 2 and FIGS. 9 and 10 of JP-A-56-015107, a structure is disclosed in which end portions of steel material are folded so that inner walls of the folding portions are in mutual contact; this structure will be referred to as a hemming structure. In pages 2 to 3 and FIGS. 1 and 4 of JP-A-6-136910, a structure is disclosed in which corner portions of a box-shaped body is formed by drawing processing.

In a planar display apparatus such as a liquid crystal device or an EL device, it is desired to make the overall thickness of a module including the metal frame as small as possible. When the side walls of the metal frame, which will be folded, has a small height in order to decrease the overall thickness of the module, the strength of the metal frame will be decreased, and the metal frame will be deformed. Consequently, a display panel, such as a liquid crystal panel or an EL panel, accommodated in the metal frame will be broken.

Moreover, in the planar display apparatus such as a liquid crystal device or an EL device, an extremely thin, planar display panel is incorporated into substantially the entire inner surface of the metal frame. The deformation of the metal frame appearing in any directions may apply stress to the display panel, which becomes the cause of breakage.

SUMMARY

An advantage of some aspects of the invention is that it provides a metal frame for electro-optical device, which can be formed sufficiently thin while maintaining sufficient mechanical strength, and an electro-optical device having the metal frame. In addition, another advantage of some aspects of the invention is that it provides a manufacturing method of a metal frame for electro-optical device, which can be formed sufficiently thin while maintaining sufficient mechanical strength, and a manufacturing method of an electro-optical device having the metal frame.

According to one aspect of the invention, there is provided an electro-optical device, including an electro-optical panel; and a metal frame configured to accommodate the electro-optical panel therein, wherein the metal frame includes a plurality of side walls and corner portions provided between the side walls, wherein a distal end of at least a portion of at least one of the side walls has a folding portion having a structure that inner surfaces are opposed to each other, and wherein at least one of the corner portions adjacent to the side wall having the folding portion has a seamless curved shape. The electro-optical panel is an electronic component capable of controlling electrical inputs to thereby cause a change in the display state by means of light. An example of such an electro-optical panel includes a display panel which is a component of a variety of display apparatuses such as a liquid crystal device, an organic EL device, or a plasma display device.

In the electro-optical device according to the above aspect of the invention, since the metal frame that accommodates the electro-optical panel therein has a folding portion at a distal end portion of at least a portion of at least one of the side walls, it is possible to increase the strength of the side walls. Moreover, since the side walls including the side wall having the folding portion are connected in a seamless curved shape, the metal frame can have a strength corresponding to the combined strengths of the folding portions, and the strength of the metal frame can be extremely increased. For this reason, the metal frame can maintain a sufficient mechanical strength even when the thickness is decreased. Therefore, since the metal frame according to the invention has a high strength despite its small thickness, even when the electro-optical panel is thin, it is possible to protect the electro-optical panel from external stress or mechanical load by the metal frame.

In the electro-optical device, the folding portion needs only to be folded at the inner side of the metal frame. When the folding portion and the distal end thereof are at the inner side of the metal frame, the electro-optical device can be designed with a smaller outer shape that is simultaneously excellent in design. In the electro-optical device, there is a case in which a frame made of resin or the like is incorporated into the inner side of the metal frame and a planar display panel such as a liquid crystal panel or an EL panel is incorporated into the frame. In such a case, a construction may be employed in which the frame made of resin or the like is positioned by using the distal end of the folding portion that is folded at the inner side of the metal frame. Alternatively, the frame made of resin or the like may be disposed at the outer side of the metal frame. In such a case, the folding portion may be folded at the outer side of the metal frame, and the frame provided at the outer side of the metal frame may be positioned and fixed by the distal end of the folding portion.

In the electro-optical device according to the above aspect of the invention, the corner portion having the seamless curved shape, of the metal frame may be formed by drawing processing of planar metal. The drawing processing is a processing method that partially compresses planar metal material to deform the material into a desired shape. The compressed metal material is increased in its mechanical strength; therefore, the strength of the corner portions formed by the drawing processing is higher than the strength of the planar metal material. According to the above aspect of the invention, it is possible to further increase the mechanical supply roller of the metal frame by cooperation of the side walls having the folding portion and the corner portions formed by the drawing processing.

In the electro-optical device according to the above aspect of the invention, the metal frame may further include a bottom portion that is oblong in plan view, i.e., rectangular or square-shaped, and the side walls having the folding portion may be formed on four sides of the bottom portion. When the side walls having the folding portion are provided on all the four sides of the bottom portion, it is possible to further increase the strength of the metal frame. Moreover, in this case, the corner portions can be provided at all the four locations between the four side walls by drawing processing. By doing this, it is possible to furthermore increase the strength of the metal frame.

The plurality of side walls may be formed on four sides of the bottom portion. The side walls on at least three sides of the four sides may have the folding portion. The side wall on at least one side of the four sides may have a cutout in a middle portion thereof. The corner portions may be formed at four locations between the side walls formed on the four sides. When a side is provided with a side wall having a cutout in a middle portion thereof, an FPC (flexible printed circuit), which is a wiring board mounted on the electro-optical panel accommodated in the metal frame, can be drawn out through the cutout. Although there is a possibility that the strength of the metal frame is decreased on the side having the cutout in the middle portion, by forming corner portions at both ends adjacent to the side by drawing processing, it is possible to suppress the degradation in strength as much as possible.

In the electro-optical device according to the above aspect of the invention, the metal frame may include a cutout portion at a distal end of a side wall disposed between the folding portion and the corner portion. When the cutout portion is provided in the distal end of the side wall between the folding portion and the corner portion, the stress generated at the time of forming the folding portion can be distributed at the cutout portion, thereby reduce the influence that the stress is transmitted to the corner portions. Moreover, the stress generated at the time of forming the corner portions can be distributed at the cutout portions, thereby reducing the influence that the stress is transmitted the folding portion. Furthermore, by forming the cutout portion, the height of the side wall having the folding portion formed therein can be made identical to the height of the corner portions.

In the electro-optical device according to the above aspect of the invention, the folding portion may have its inner surfaces which are in mutual contact.

According to another aspect of the invention, there is provided a metal frame for electro-optical device, including: a plurality of side walls; and corner portions provided between the side walls, wherein a distal end of at least a portion of at least one of the side walls has a folding portion having a structure that inner surfaces are opposed to each other, and wherein at least one of the corner portions has a seamless curved shape.

The metal frame for electro-optical device according to the invention is used as a frame for accommodating and protecting an electronic component or as a frame for organizing and accommodating a plurality of electronic components. An example of the electronic component includes a variety of components that constitutes a flat panel display such as a liquid crystal device, an organic EL device, or a plasma display device. The metal frame of the invention is a container of a box type, a dish type, or a tray type, formed by a bottom portion, side walls, and corner portions.

Since the metal frame for electro-optical device according to the invention has a folding portion at a distal end portion of at least a portion of at least one of the side walls, it is possible to increase the strength of the side walls. Moreover, since the side walls including the side wall having the folding portion are connected in a seamless curved shape, the metal frame can have a strength corresponding to the combined strengths of the folding portions, and the strength of the metal frame can be extremely increased. For this reason, the metal frame can maintain a sufficient mechanical strength even when the thickness is decreased.

According to another aspect of the invention, there is provided a method for manufacturing an electro-optical device, the method including: a metal frame forming step for forming a metal frame comprising a plurality of side walls and corner portions provided between the side walls; and an electro-optical device accommodation step for accommodating an electro-optical device in the metal frame. The metal frame forming step includes: a folding processing step wherein a folding portion having a structure obtained by folding planar plate so that inner surfaces are opposed to each other is formed at a distal end of at least a portion of at least one of the regions serving as the side walls; and a side wall and corner portion forming step wherein the regions serving as the plurality of side walls are formed by folding processing so that the folded region is at the inner side and wherein the corner portions are formed by drawing processing. The side wall and corner portion forming step is carried out by using an inner metal mold which is disposed in a region of the planar plate, serving as the interior of the metal frame and outer metal molds which are disposed in regions serving as the exterior of the metal frame. The inner metal mold has movable molds which are disposed so as to correspond to the regions serving as the corner portions. Each of the movable molds is formed by a middle portion having a shape that forms the corner portions and a pair of branch portions that extend in mutually perpendicular directions from the middle portion. The movable molds are movable in both expanding and contracting directions. The folding processing for forming the side walls and the drawing processing for forming the corner portions are carried out by cooperation of the inner metal mold and the outer metal mold in a state in which the movable molds are expanded in the interior of the metal frame. A step of pulling the inner metal mold to the exterior of the metal frame is carried out in a state in which the movable molds are contracted in the interior of the metal frame.

According to the manufacturing method of the electro-optical device according to the above aspect of the invention, it is possible to manufacture with high accuracy a metal frame that includes a plurality of side walls having a folding portion and corner portions provided between the side walls. Moreover, the side walls and the corner portions can be formed through a single step of the side wall and corner portion forming step. For this reason, it is possible to manufacturing a metal frame having an extremely high strength despite its small thickness in a short time and at low cost with lesser process steps.

In the manufacturing method of the electro-optical device according to the above aspect of the invention, spaces may be provided between the branch portions of a pair of mutually adjacent movable molds so that the pair of movable molds is allowed to move in the contracting direction, and the spaces may be provided at positions located closer to any of the corner portions than a central portion of the side walls of the metal frame. Since the spaces provided between mutually adjacent movable molds are portions where the metal molds are not present, portions of the side walls corresponding to the spaces have a possibility that the dimensional accuracy is degraded after processing. When the portions are provided so as to correspond to the center portions of the side walls, they are positioned distant from the corner portions having high strength; therefore, there is a fear that the overall strength of the metal frame is decreased. On the other hand, when the portions are provided at positions displaced from the center portions of the side walls, that is, they are provided so as to correspond to positions close to any of the corner portions (portions having high strength), it is possible to suppress degradation in the overall strength of the metal frame. Therefore, it is desirable that the spaces provided between the plurality of movable molds are provided at positions closer to any of the corner portions than the center portions of the side walls of the metal frame.

In the manufacturing method of the electro-optical device according to the above aspect of the invention, spaces may be provided between the branch portions of a pair of mutually adjacent movable molds so that the pair of movable molds is allowed to move in the contracting direction, and the spaces may be provided so as to correspond to portions of the side walls of the metal frame, at which an allowable tolerance of dimensional accuracy is large. Since the spaces provided between mutually adjacent movable molds are portions where the metal molds are not present, portions of the side walls corresponding to the spaces have a possibility that the dimensional accuracy is degraded after processing. The allowable tolerance of dimensional accuracy at portions of the metal frame depends on the shape of the metal frame itself or the shape of the electronic component accommodated in the metal frame. For example, at portions where a gap between the side walls of the metal frame and an accommodated material should be designed small, the allowable tolerance of dimensional accuracy decreases. Therefore, it is desirable that the spaces are not provided at positions corresponding to such portions.

In the manufacturing method of the electro-optical device according to the above aspect of the invention, the inner metal mold may further include auxiliary molds that cover spaces between mutually adjacent movable molds when the movable molds are expanded. The auxiliary molds may be movable in both the expanding direction and the contracting direction. The folding processing for forming the side walls and the drawing processing for forming the corner portions may be carried out by cooperation of the inner metal mold and the outer metal mold in a state in which the movable molds are expanded in the interior of the metal frame. A step of pulling the inner metal mold to the exterior of the metal frame may be carried out in a state in which the movable molds are contracted in the interior of the metal frame.

As described above, since the spaces provided between mutually adjacent movable molds are portions where the metal molds are not present, if any countermeasures are not taken, portions of the side walls corresponding to the spaces have a possibility that the dimensional accuracy is degraded after processing. To the contrary, according to the above aspect of the invention, since the spaces between the movable molds are covered by the auxiliary molds, it is possible to perform with accuracy the folding processing for forming the side walls by using the auxiliary molds. Therefore, it is possible to prevent any partial degradation in dimensional accuracy of the side walls.

In the manufacturing method of the electro-optical device according to the above aspect of the invention, the movable molds may be biased in the expanding direction or the contracting direction by elastic force and may be pressed by a pressing member so that they are moved in the contracting direction or the expanding direction while resisting against the elastic force. With this configuration, it is possible to move the movable molds between a processing position and an retracted position in a secure and rapid manner.

In the manufacturing method of the electro-optical device according to the aspect of the invention where the auxiliary molds are provided in addition to the movable molds, the movable molds and the auxiliary molds may be biased in the expanding direction or the contracting direction by elastic force and may be pressed by a pressing member so that they are moved in the contracting direction or the expanding direction while resisting against the elastic force. With this configuration, it is possible to move the movable molds and the auxiliary molds between a processing position and a retracted position in a secure and rapid manner.

According to another aspect of the invention, there is provided a method for manufacturing a metal frame for electro-optical device, the method including: a folding processing step wherein a folding portion having a structure obtained by folding planar plate having regions serving as a plurality of side walls so that inner surfaces are opposed to each other is formed at a distal end of at least a portion of at least one of the regions serving as the side walls; and a side wall and corner portion forming step wherein the regions serving as the plurality of side walls are formed by folding processing so that the folded region is at the inner side and wherein regions serving as corner portions which are provided between the regions serving as the plurality of side walls are formed by drawing processing, wherein the side wall and corner portion forming step is carried out by using an inner metal mold which is disposed in a region of the planar plate, serving as the interior of the metal frame and outer metal molds which are disposed in regions serving as the exterior of the metal frame, wherein the inner metal mold has movable molds which are disposed so as to correspond to the regions serving as the corner portions, wherein each of the movable molds is formed by a middle portion having a shape that forms the corner portions and a pair of branch portions that extend in mutually perpendicular directions from the middle portion, wherein the movable molds are movable in both expanding and contracting directions, wherein the folding processing for forming the side walls and the drawing processing for forming the corner portions are carried out by cooperation of the inner metal mold and the outer metal mold in a state in which the movable molds are expanded in the interior of the metal frame, and wherein a step of pulling the inner metal mold to the exterior of the metal frame is carried out in a state in which the movable molds are contracted in the interior of the metal frame.

As a result of using the manufacturing method of the metal frame for electro-optical device according to the above aspect of the invention, it is possible to manufacture with high accuracy a metal frame that includes a plurality of side walls having a folding portion and corner portions provided between the side walls. Moreover, the side walls and the corner portions can be formed through a single step of the side wall and corner portion forming step. For this reason, it is possible to manufacturing a metal frame having an extremely high strength despite its small thickness in a short time and at low cost with lesser process steps.

In the manufacturing method of the metal frame for electro-optical device according to the above aspect of the invention, spaces may be provided between the branch portions of a pair of mutually adjacent movable molds so that the pair of movable molds is allowed to move in the contracting direction, and the spaces may be provided at positions located closer to any of the corner portions than a central portion of the side walls of the metal frame. Since the spaces provided between mutually adjacent movable molds are portions where the metal molds are not present, portions of the side walls corresponding to the spaces have a possibility that the dimensional accuracy is degraded after processing. When the portions are provided so as to correspond to the center portions of the side walls, they are positioned distant from the corner portions having high strength; therefore, there is a fear that the overall strength of the metal frame is decreased. On the other hand, when the portions are provided at positions displaced from the center portions of the side walls, that is, they are provided so as to correspond to positions close to any of the corner portions (portions having high strength), it is possible to suppress degradation in the overall strength of the metal frame. Therefore, it is desirable that the spaces provided between the plurality of movable molds are provided at positions closer to any of the corner portions than the center portions of the side walls of the metal frame.

In the manufacturing method of the metal frame for electro-optical device according to the above aspect of the invention, spaces may be provided between the branch portions of a pair of mutually adjacent movable molds so that the pair of movable molds is allowed to move in the contracting direction, and the spaces may be provided so as to correspond to portions of the side walls of the metal frame, at which an allowable tolerance of dimensional accuracy is large. Since the spaces provided between mutually adjacent movable molds are portions where the metal molds are not present, portions of the side walls corresponding to the spaces have a possibility that the dimensional accuracy is degraded after processing. The allowable tolerance of dimensional accuracy at portions of the metal frame depends on the shape of the metal frame itself or the shape of the electronic component accommodated in the metal frame. For example, at portions where a gap between the side walls of the metal frame and an accommodated material should be designed small, the allowable tolerance of dimensional accuracy decreases. Therefore, it is desirable that the spaces are not provided at positions corresponding to such portions.

In the manufacturing method of the metal frame for electro-optical device according to the above aspect of the invention, the inner metal mold may further include auxiliary molds that cover spaces between mutually adjacent movable molds when the movable molds are expanded. The auxiliary molds may be movable in both the expanding direction and the contracting direction. The folding processing for forming the side walls and the drawing processing for forming the corner portions may be carried out by cooperation of the inner metal mold and the outer metal mold in a state in which the movable molds are expanded in the interior of the metal frame. A step of pulling the inner metal mold to the exterior of the metal frame may be carried out in a state in which the movable molds are contracted in the interior of the metal frame.

As described above, since the spaces provided between mutually adjacent movable molds are portions where the metal molds are not present, if any countermeasures are not taken, portions of the side walls corresponding to the spaces have a possibility that the dimensional accuracy is degraded after processing. To the contrary, according to the above aspect of the invention, since the spaces between the movable molds are covered by the auxiliary molds, it is possible to perform with accuracy the folding processing for forming the side walls by using the auxiliary molds. Therefore, it is possible to prevent any partial degradation in dimensional accuracy of the side walls.

In the manufacturing method of the metal frame for electro-optical device according to the above aspect of the invention, the movable molds may be biased in the expanding direction or the contracting direction by elastic force and may be pressed by a pressing member so that they are moved in the contracting direction or the expanding direction while resisting against the elastic force. With this configuration, it is possible to move the movable molds between a processing position and a retracted position in a secure and rapid manner.

In the manufacturing method of the metal frame for electro-optical device according to the aspect of the invention where the auxiliary molds are provided in addition to the movable molds, the movable molds and the auxiliary molds may be biased in the expanding direction or the contracting direction by elastic force and may be pressed by a pressing member so that they are moved in the contracting direction or the expanding direction while resisting against the elastic force. With this configuration, it is possible to move the movable molds and the auxiliary molds between a processing position and a retracted position in a secure and rapid manner.

According to another aspect of the invention, there is provided an apparatus for manufacturing a metal frame for electro-optical device, the apparatus including an inner metal mold that is disposed inside a metal frame having a plurality of side walls and corner portions provided between the side walls and an outer metal mold that is disposed outside the metal frame. The inner metal mold includes movable molds that are disposed opposite the corner portions. Each of the movable molds is formed by a middle portion having a shape corresponding to the corner portions and a pair of branch portions that extend in mutually perpendicular directions from the middle portion. The movable molds are movable between an expanded position wherein they make contact with the side walls and the inner circumferential surfaces of the corner portions and a contracted position wherein they are contracted from the expanded position.

According to the manufacturing apparatus of the metal frame of the electro-optical device according to the above aspect of the invention, it is possible to manufacture with high accuracy a metal frame that includes a plurality of side walls having a folding portion in at least a portion thereof and corner portions provided between the side walls. Moreover, by moving the movable molds between the expanded position and the contracted position, it is possible to perform the folding processing of the side walls and the drawing processing of the corner portions at the same time in a single step. For this reason, it is possible to manufacturing a metal frame having an extremely high strength despite its small thickness in a short time and at low cost with lesser process steps.

In the manufacturing apparatus of the metal frame for electro-optical device according to the above aspect of the invention, similar to the manufacturing method of the metal frame for electro-optical device according to the above aspect of the invention, the inner metal mold may further include auxiliary molds that cover spaces between mutually adjacent movable molds when the movable molds are expanded. The auxiliary molds may be movable between an expanded position wherein the outer circumferential surfaces thereof make abutting contact with the outer circumferential surfaces of the branch portions of the movable molds and a contracted position wherein they are contracted from the expanded position.

According to another aspect of the invention, there is provided an electronic apparatus having the electro-optical device according to the above aspect of the invention. The electro-optical device may be a liquid crystal device, an organic EL device, or a plasma display device.

Since the metal frame for electro-optical device according to the above aspect of the invention has a folding portion at a distal end portion of at least a portion of the side walls, it is possible to increase the strength of the side walls. Moreover, since the side walls having the folding portion are connected in a seamless curved shape, the metal frame can have a strength corresponding to the combined strengths of the folding portions, and the strength of the metal frame can be extremely increased. For this reason, the metal frame can maintain a sufficient mechanical strength even when the thickness is decreased. Therefore, since the electronic apparatus having the metal frame for electro-optical device according to the invention has a high strength despite its small thickness, even when the electro-optical panel of the electro-optical device is thin, it is possible to protect the electro-optical panel from external stress or mechanical load by the metal frame.

BRIEF DESCRIPTION OF THE DRAWINGS

The invention will be described with reference to the accompanying drawings, wherein like numbers reference like elements.

FIGS. 5A to 5C are a plan view and side views illustrating the manufacturing procedures of the metal frame, subsequent to those shown in FIGS. 4A to 4C.

FIG. 7 is a side view showing an example of a metal mold for use in the manufacturing method of the metal frame according to the embodiment of the present invention.

DESCRIPTION OF EXEMPLARY EMBODIMENTS

Figure 1A:
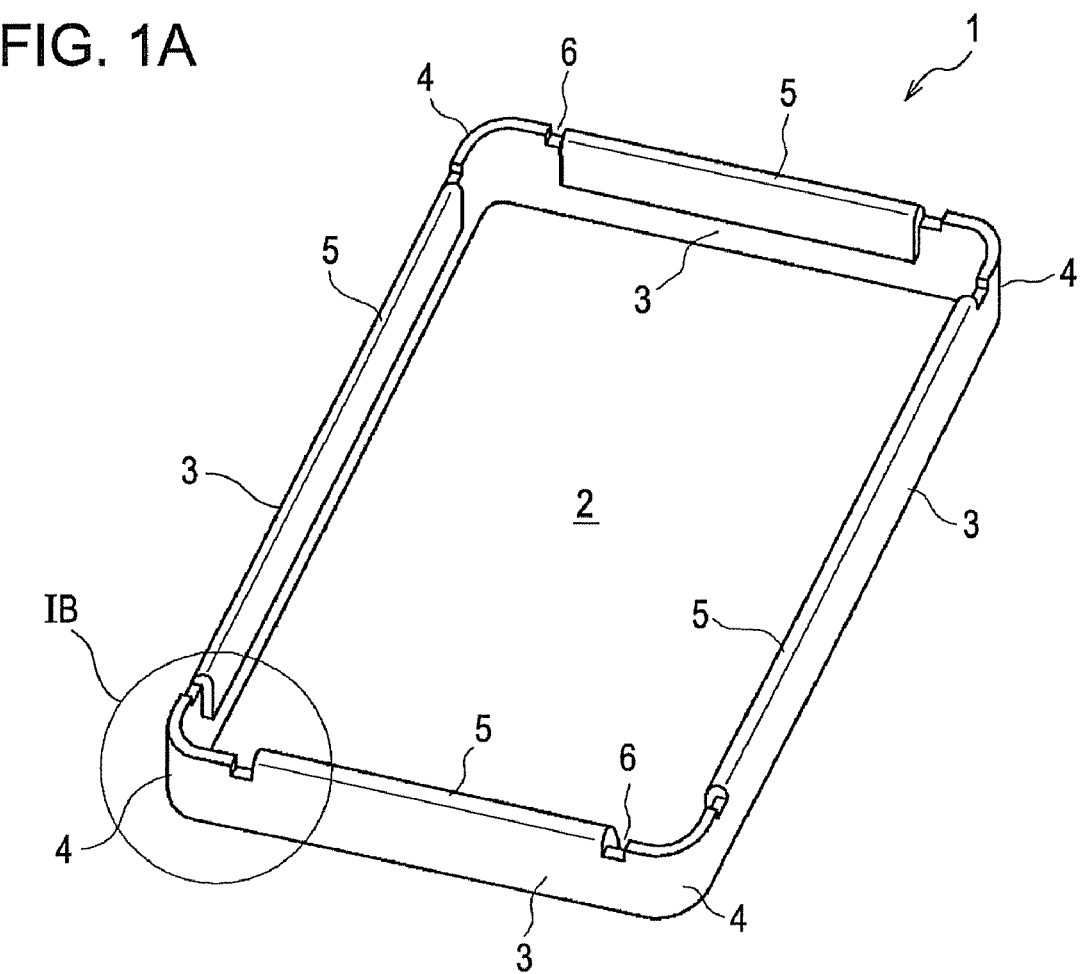
FIGS. 1A and 1B are perspective views of a metal frame according to one embodiment of the present invention.

First Embodiment of Metal Frame for Electro-optical Device

Hereinafter, a metal frame for electro-optical device according to exemplary embodiments of the invention will be described in detail with reference to the accompanying drawings. It is to be noted that the invention is not limited to the embodiments. In the drawings used for the description, in order to better illustrate characteristic portions, some of the components or elements of the invention are intentionally illustrated with different dimensional ratios from the actual one.

Figure 1B:
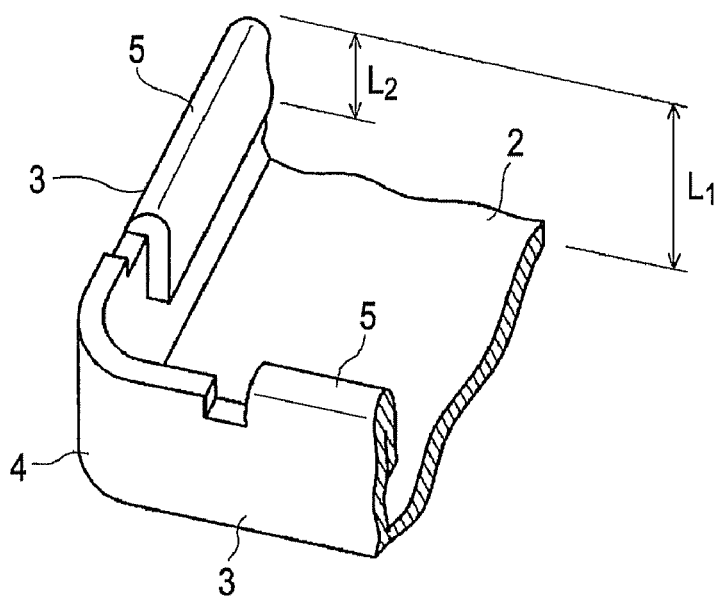

FIG. 1A is a perspective view of a metal frame for electro-optical device according to one embodiment of the present invention. FIG. 1B is an enlarged view of the vicinity of a corner portion of the metal frame. In FIG. 1A, the metal frame 1 is formed by processing a stainless steel plate (SUS) having a predetermined thickness, for example, of 0.1 mm to 0.3 mm, preferably, of 0.2 mm. The steel plate for forming the metal frame 1 is illustrated thicker than the actual one. The metal frame 1 includes a bottom portion 2 that is rectangular, i.e., oblong-shaped, side walls 3 provided on four sides of the bottom portion 2, and corner portions 4 provided between the side walls 3.

Folding portions 5 are provided at the distal ends (upper ends in the drawing) of the side walls 3. The folding portions 5 have a hemming structure that is a bent structure formed by folding the portions so that inner surfaces thereof are in mutual contact. Notch portions 6 are formed between the folding portions 5 and the corner portions 4. In this manner, by providing the notch portions 6 to the side walls between the folding portions 5 and the corner portions 4, the stress generated at the time of forming the folding portions 5 can be distributed at the notch portions 6, thereby reducing the influence that the stress is transmitted to the corner portions 4. Moreover, the stress generated at the time of forming the corner portions 4 can be distributed at the notch portions 6, thereby reducing the influence that the stress is transmitted to the folding portions 5. Furthermore, by forming the notch portions 6, the height of the side wall 3 having the folding portions 5 formed therein can be made identical to the height of the corner portions 4. The folding portions 5 are formed in such a manner that the SUS steel plate for the side walls 3 is preliminarily formed with a large width having a folding margin and, the folding margin is folded by a processing machine. Since the folding portions 5 are provided at the distal ends of the side walls 3, it is possible to increase the strength of the metal frame 1 against loads applied in both vertical and horizontal directions and the strength of the metal frame 1 against the bending force applied thereto.

The side walls 3 themselves are planar plate portions of the bottom portion 2 that extend outward, and are formed by folding the planer plate portions having the folding portions formed at the distal ends thereof at about 90 degrees using a processing machine so that the region where the folding portions are folded are at the inner side. The height L1 of the side walls 3 is, for example, 1 mm to 2 mm, preferably, 1.2 mm. The length L2 of the folded portions of the folding portions 5 is 0.6 mm, for example. The side walls 3 are illustrated thicker than the actual one.

The corner portions 4 are provided at locations between the four side walls 3. The corner portions 4 are provided in a state where they are standing at about 90 degrees to the bottom portion 2 and are curved like a circular arc about an axial line perpendicular to the bottom portion 2. The curvature of the corner portions 4 is illustrated greater than the actual one. The corner portions 4 are formed by drawing processing. Specifically, the corner portions 4 are formed by cooperation of an inner metal mold and an outer metal mold by moving the metal molds in parallel directions relative to a direction perpendicular to the bottom portion 2. The inner metal mold has a curved shape that conforms to the curved shape of the inner surface of the corner portions 4 and is disposed at the inner surface side of the planar plate portions of the bottom portion 2 that extend outward. The outer metal mold has a curved shape that conforms to the curved shape of the outer surface of the corner portions 4 and is disposed at the outer surface side of the planar plate portions. In this manner, the corner portions 4 are formed by performing drawing processing to the planar steel plate; therefore, the corner portions 4 have a seamless curved shape. By the function of the seamless corner portions 4, the folding portions 5 of the side walls 3 mutually adjacent with the corner portions 4 disposed between them interact with each other to thereby further increasing the strength under load and the strength under bending.

The inner circumferential surface of the corner portions 4 that have been subjected to drawing processing is in a state (i.e., throttled state) wherein the steel plate is contracted from the state of the planar plate. Such a throttled state is a state wherein the microstructures of the steel plate are arranged with high density, and the mechanical strength is increased. For this reason, the metal frame 1 having the corner portions 4 formed by drawing processing has a high strength against loads applied in both vertical and horizontal direction and against bending force. Particularly, in the present embodiment, since the corner portions 4 are formed by the drawing processing, and at the same time, the folding portions 5 are provided at the distal ends of the side walls 3 disposed between the corner portions 4, the overall strength of the metal frame 1 can be extremely increased. For this reason, even though the metal frame 1 has an extremely small height of about 1 mm to about 2 mm, i.e., despite its extremely small thickness, the metal frame 1 can provide a sufficient strength for protecting electronic components accommodated therein.

In the present embodiment, the heights of the four side walls 3 having the folding portions 5 measured from the bottom surface (back surface in the drawing) of the bottom portion 2 are set to the same values. Moreover, the heights of the corner portions 4 are set approximately identical to the heights of the side walls 3. However, the heights of the four side walls 3 may be set differently according to the needs. For example, the height of one of the side walls 3 may be smaller or larger than that of the remaining, three side walls 3. Moreover, the four side walls 3 may be evenly divided into two groups, and the height of the side walls in one group may be smaller than that of the side walls in the other group. Furthermore, the individual ones of the four side walls 3 may have mutually different heights. In addition, it is to be noted that the present embodiment is not limited to this, and the planar plate portions having the folding portions formed at the distal ends thereof may be formed such that the folded regions of the folding portions are at the outer side.

Second Embodiment of Metal Frame for Electro-optical Device

Figure 2:
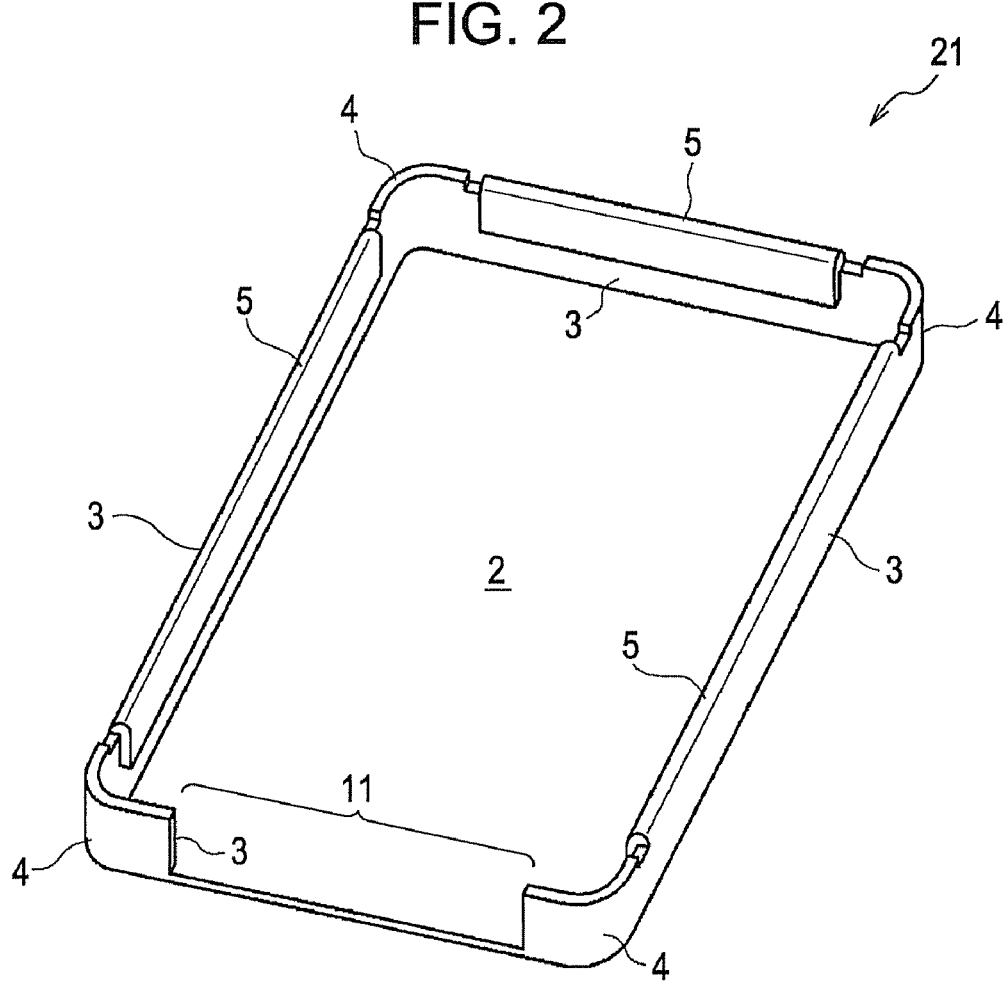
FIG. 2 is a perspective view of a metal frame according to another embodiment of the present invention.

FIG. 2 shows a metal frame for electro-optical device according to another embodiment of the invention. In FIG. 2, the same components or elements will be denoted by the same reference numerals as FIGS. 1A and 1B, and redundant descriptions thereof will be omitted. The metal frame 21 shown in the drawing is different from the metal frame 1 shown in FIG. 2 in that the side wall 3 corresponding to the front shorter side, of the side walls 3 formed on the four sides of the bottom portion 2 is not provided with the folding portion 5 at the distal end portion thereof, and has a cutout 11 in the middle portion thereof. The folding portions 5 are provided at the distal end portions of the side walls 3 corresponding to the remaining three sides. Moreover, the corner portions 4 are provided at four locations between the side walls 3 formed on the four sides of the bottom portion 2. That is, the corner portions 4 are provided at both sides of the side wall 3 having the cutout 11 formed therein.

In the present embodiment, the depth of the cutout 11 is approximately the same as the height of the side walls 3, and the cutout 11 is directly connected to the bottom portion 2. However, the depth of the cutout 11 can be appropriately set according to the needs. When the depth of the cutout 11 is smaller (shallower) than the height of the side walls 3 corresponding to the other sides, a side wall 3 having a small height is provided between the cutout 11 and the bottom portion 2.

The metal frame 21 having the cutout 11 is extremely suitable when accommodating electronic components to which an FPC (flexible printed circuit) board is connected. When the FPC board connected to the electronic components is drawn out through the cutout 11 in a state in which the electronic components are accommodated in the metal frame 21, the drawing-out operation can be carried out without applying unnecessary loads to the FPC board.

In the present embodiment, the folding portion 5 are provided at the distal ends of three side walls 3 of the metal frame 21, and the corner portions 4 are formed at locations between all the four side walls 3 by drawing processing. That is, the corner portions 4 are also formed by the drawing processing at both ends of the side wall 3 in which the cutout 11 is provided but the folding portion 5 is not provided. The method for forming the corner portions 4 and the folding portions 5 are the same as that of the case of manufacturing the metal frame 1 shown in FIGS. 1A and 1B. In the present embodiment, there is a possibility that the strength of the metal frame 21 is decreased on the portion having no folding portions 5. However, since the corner portions 4 are formed by the drawing processing at both ends of the portion without the folding portions 5, it is possible to suppress the degradation in the mechanical strength as much as possible. In addition, in the present embodiment, the planar plate portions having the folding portions formed at the distal ends thereof may be formed such that the folded regions of the folding portions are at the outer side.

First Embodiment of Method and Apparatus for Manufacturing Metal Frame for Electro-optical Device Next, a manufacturing method of the metal frame 1 for electro-optical device shown in FIG. 1 and a manufacturing apparatus for actualizing the manufacturing method will be described.

Figure 3:
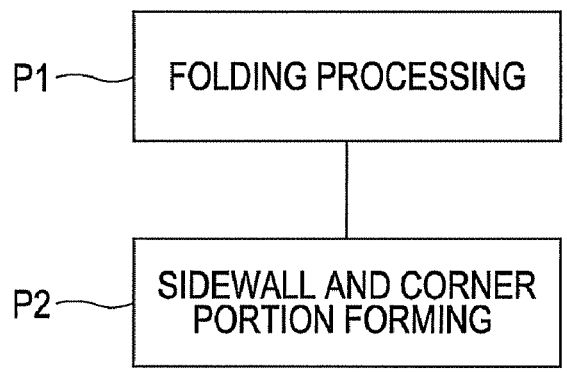
FIG. 3 is a diagram showing the process steps of a manufacturing method of a metal frame according to one embodiment of the present invention.
Figure 4A:
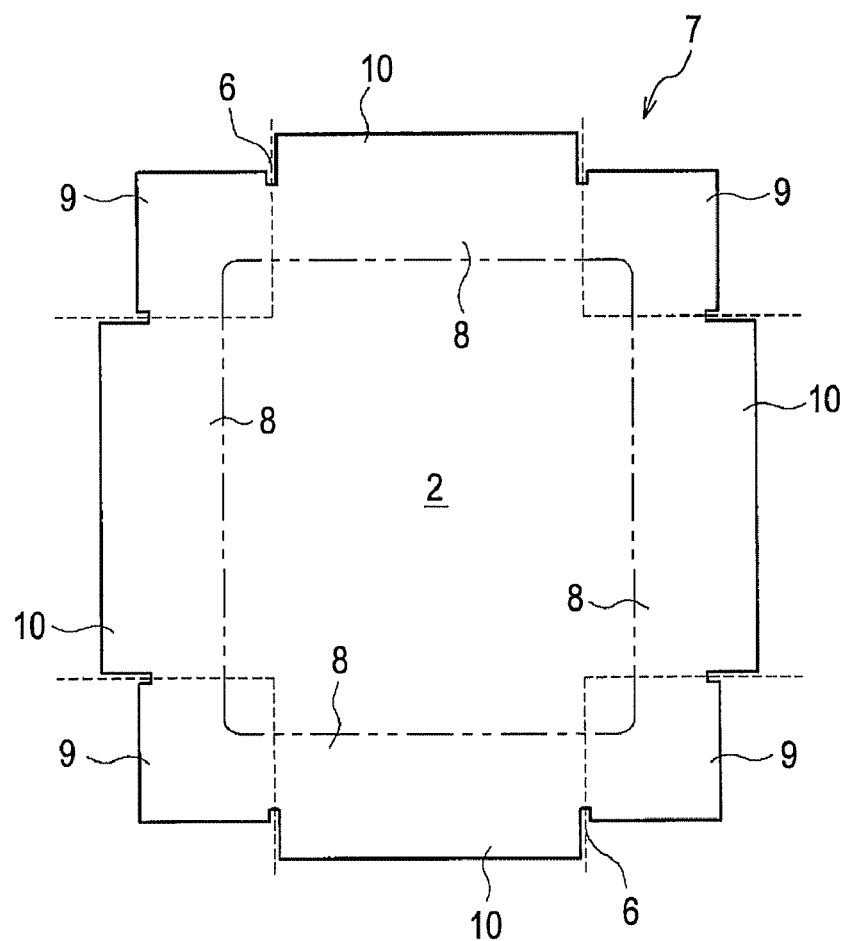
FIGS. 4A to 4C are a plan view and side views illustrating the manufacturing procedures of the metal frame.
Figure 4B:
Figure 4C:
Figure 6A:
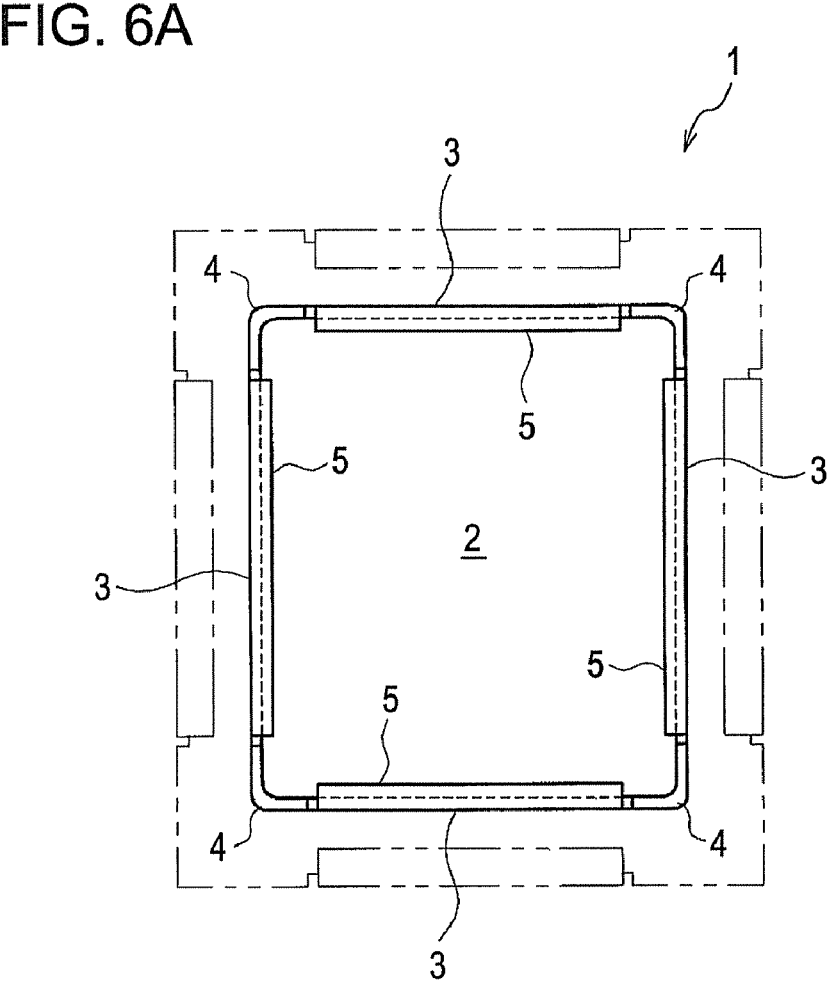
FIGS. 6A to 6C are a plan view and side views illustrating the manufacturing procedures of the metal frame, subsequent to those shown in FIGS. 5A to 5C.
Figure 6B:
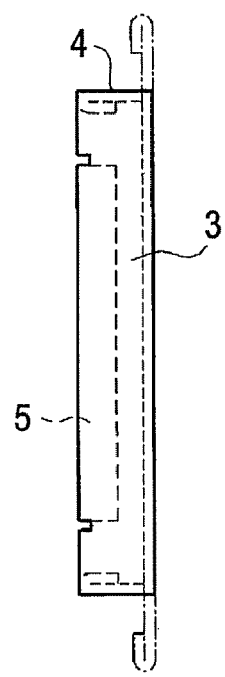
Figure 6C:
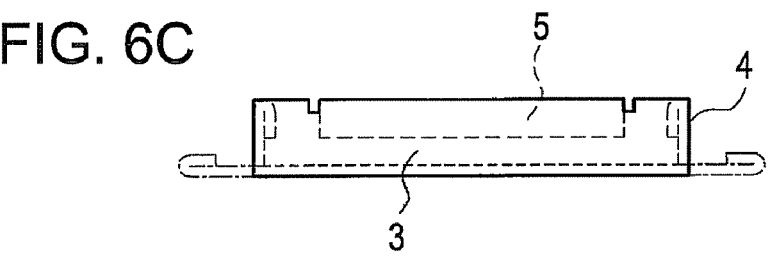

FIG. 3 is a diagram showing the process steps of a manufacturing method of a metal frame for electro-optical device according to the present embodiment. FIGS. 4 to 6 show the manufacturing procedures until the SUS steel plate is formed into a metal frame. Specifically, FIGS. 4A to 4C are development views of the steel plate, FIGS. 5A to 5C show the states where the folding portions are formed, and FIGS. 6A to 6C show the states of the finished metal frame. In the drawings, FIGS. 4A, 5A, and 6A are plan views, FIGS. 4B, 4C, 6B, and 6C are sectional views, and FIGS. 5B and 5C are side sectional views.

The manufacturing method of the metal frame for electro-optical device according to the present embodiment includes a folding processing step P1 and subsequently a side wall and corner portion forming step P2, as shown in FIG. 3. In the folding processing step P1, a planar SUS steel plate 7 is prepared as shown in FIGS. 4A to 4C. A portion of the steel plate 7 denoted by reference numeral 2 and surrounded by the chained line is a portion corresponding to the bottom portion 2 in FIG. 1A. Reference numeral 8 represents portions serving as the side walls 3 in FIG. 1A, which are subjected to folding processing. Reference numeral 9 represents portions serving as the corner portions 4 in FIG. 1A, which are subjected to drawing processing. Reference numeral 10 represents portions corresponding to the folding margins of the folding portions 5 in FIG. 1A. In the drawings, although the distal ends of the portions 9 corresponding to the corner portions 4 are illustrated as a right angled shape having 90 degrees, they actually have an appropriate shape other than the right angled shape so that the upper ends of the corner portions 4 are parallel with each other after the drawing processing is performed thereto.

In the folding processing step P1, the folding margins 10 in FIG. 4A are folded toward one principal surface of the steel plate 7, whereby folding portions having a folded structure, as denoted by reference numeral 5 in FIGS. 5A to 5C, are formed such that the inner surfaces are in mutual contact. Next, the side wall and corner portion forming step P2 is performed. The step P2 is carried out by using an inner metal mold 12 and an outer metal mold 13 shown in FIGS. 7 and 8, for example. The inner metal mold 12 includes four movable molds 14 that are arranged along the outer edge line of the bottom portion 2 of the metal frame 1, and an elastic force applying mechanism 15 (see FIG. 8) that applies elastic force to the movable molds 14, and a pressing member 16 (see FIG. 7) that presses the movable molds 14.

Figure 8:
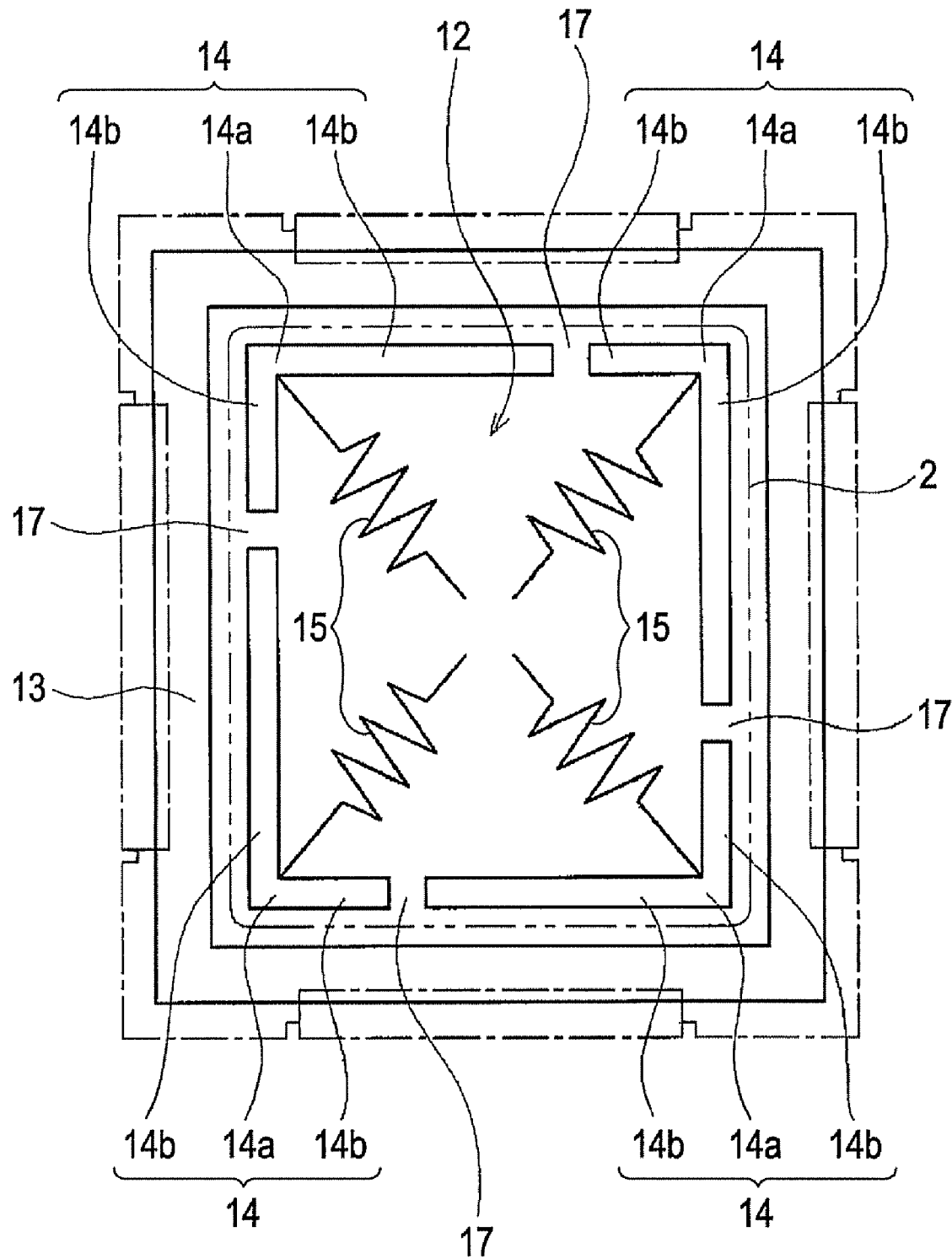
FIG. 8 is a plan view of the metal mold shown in FIG. 7.

Although the elastic force applying mechanism 15 is schematically illustrated as spring in FIG. 8, the mechanism actually has an appropriate construction according to the needs. However, the elastic force applying mechanism 15 is basically configured to move the four movable molds 14 toward the inner side in parallel directions to thereby apply elastic force, for example, spring force, in directions for which they are contracted toward the center portion. Each of the movable molds 14 is formed by a middle portion 14a having a curved shape that conforms to the curved shape of the inner circumferential surface of the corner portions 4 in FIG. 1A, and a pair of branch portions 14b that extend in mutually perpendicular directions from the middle portion 14a. The lengths of the paired branch portions 14b and 14b are slightly different; therefore, the movable molds 14 have a substantially L shape. In addition, spaces 17 are provided at locations between the branch portions 14b of the paired movable molds 14 that are mutually adjacent to each other.

The spaces 17 are for allowing the movement of the movable molds 14 in the directions for which the movable molds 14 are contracted toward the center portion. The positions of the spaces 17 relative to the side walls 3 are not particularly limited, and the spaces 17 may be located at positions corresponding to the center portions of the side walls 3 and may be located at positions closer to any of the movable molds 14 while being displaced from the center portions. Since the locations of the spaces 17 are portions where the metal molds are not present, the bending accuracy of portions of the side walls 3 corresponding to the spaces 17 is likely to slightly decrease when the side walls 3 are formed from the steel plate by the bending processing. Therefore, it is desirable that the spaces 17 are provided so as to correspond to portions of the side walls 3, at which an allowable tolerance of dimensional accuracy is large, that is, at which high dimensional accuracy is not required. Moreover, there is a possibility that the portions of the side walls 3 corresponding to the spaces 17 may have decreased strength against loads and bending. Therefore, it is desirable that the spaces 17 are provided at positions closer to any of the middle portions 14a than the center portions of the side walls 3.

When the steel plate 7 of FIG. 5A having undergone the folding processing step P1 of FIG. 3 is put into the side wall and corner portion forming step P2 of FIG. 3, the steel 7 is placed on a table 18 in a state where the folding portions 5 are on the upper side, as shown in FIG. 7. Then, the movable molds 14 of the inner metal mold 12 are brought into pressing contact with portions on the upper principal surface of the steel plate 7 corresponding to the bottom portion 2. At this time, the movable molds 14 are set at an expanded position wherein they are expanded outward by the pressing member 16. Moreover, the outer metal mold 13 provided around the table 18 is brought into pressing contact with portions of the lower principal surface of the steel plate 7 located at the outer side than the movable molds 14 of the inner metal mold 12. Furthermore, the outer metal mold 13 is moved upward in a parallel direction relative to the inner metal mold 12 in a state where the inner metal mold 12 is fixed on the table 18. In this manner, by the cooperation of the inner metal mold 12 and the outer metal mold 13, as shown in FIGS. 6A to 6C, the side walls 3 having the folding portions 5 are formed by bending processing with an angle of about 90 degrees to the peripheral edge portion of the bottom portion 2, and at the same time, the corner portions 4 are formed by drawing processing at locations between the mutually adjacent side walls 3. In this way, the metal frame 1 is obtained. At this time, the branch portions 14b of the movable molds 14 are disposed below the folding portions 5 of the folded side walls 3 in a state where they are in abutting contact with the inner circumferential surfaces of the side walls 3.

Figure 9A:
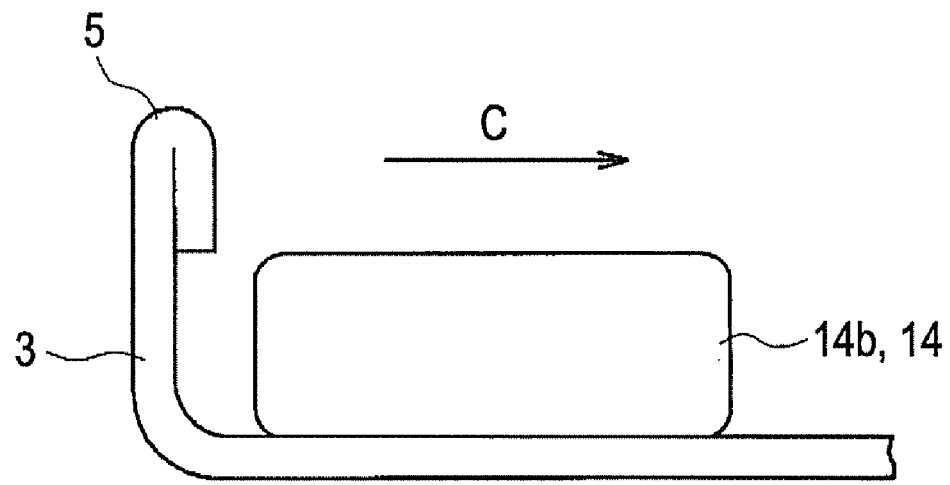
FIGS. 9A and 9B are diagrams for explaining the operation of the metal mold shown in FIGS. 7 and 8.
Figure 9B:
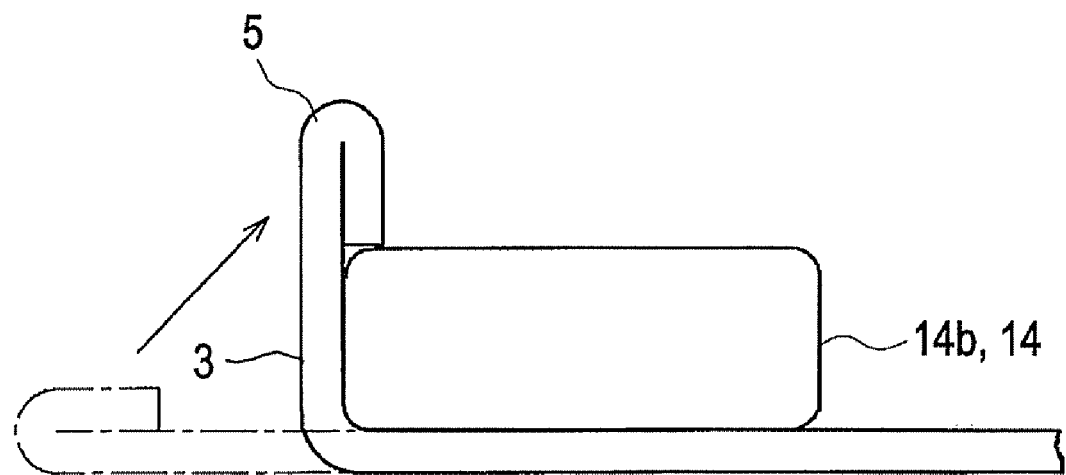

Next, the pressing member 16 of the inner metal mold 12 is moved upward as denoted by the arrow B in FIG. 7. With this movement, the four movable molds 14 are moved in parallel directions so that they are contracted toward the center portion by the function of the elastic force applying mechanism 15 of FIG. 8. As a result, as shown in FIG. 9B, the branch portions 14b of the movable molds 14 in abutting contact with the inner circumferential surfaces of the side walls 3 are moved toward the inner side as denoted by the arrow C in FIG. 9A and are disposed at regions displaced from the folding portions 5. Thereafter, since the whole inner metal mold 12 is moved upward in FIG. 7, the inner metal mold 12 is pulled out from the metal frame 1. At this time, since the movable molds 14 are moved toward the inner sides of the folding portions 5, the movable molds 14 do not collide with the folding portions 5 when the inner metal mold 12 is pulled out.

As described above, according to the present embodiment, it is possible to manufacture with high accuracy the metal frame 1 of FIG. 1A, that is, the metal frame 1 that includes the folding portions 5 having the side walls 3 at the distal ends thereof and the corner portions 4 formed at locations between the mutually adjacent side walls 3 by drawing processing. Moreover, in the present embodiment, the side wall and corner portion forming step P2 of FIG. 3 is carried out by using the movable molds 14 capable of sliding between the expanded position and the contracted position. Therefore, the side walls 3 and the corner portions 4 in FIG. 1A can be simultaneously formed in a single step, and it is thus extremely efficient.

Furthermore, the spaces 17 provided at locations between the branch portions 14b of the mutually adjacent movable molds 14 in order to allow the contraction movement of the movable molds 14 are not located at positions corresponding to the center portions of the side walls 3 but are located at position closer to any of the middle portions 14a than the center portions. Since the portions corresponding to the spaces 17 are portions where the metal molds are not present, the processing accuracy of the corresponding portions of the side walls 3 is decreased, and depending on cases, there is a possibility that the mechanical strength of the side walls 3 is decreased. For this reason, when the portions are present at the center portions of the side walls 3, there is a possibility that the overall mechanical strength of the metal frame 1 is decreased. Meanwhile, the strength of the corner portions 4 of the metal frame formed by the drawing processing is increased by the middle portions 14a. On the other hand, since the center portions of the side walls 3 are disposed distant from the corner portions 4 having high strength, the strength is lower than that of the corner portions 4. For this reason, it is not desirable to provide the spaces 17 so as to correspond to the center portions of the side walls 3 having low strength. However, in the present embodiment, since the spaces 17 are provided at positions displaced from the center portions of the side walls 3, that is, at positions closer to the corner portions 4 formed by the drawing processing, it is possible to prevent considerable degradation in the mechanical strength of the side walls 3 of the finished metal frame 1.

Figure 10A:
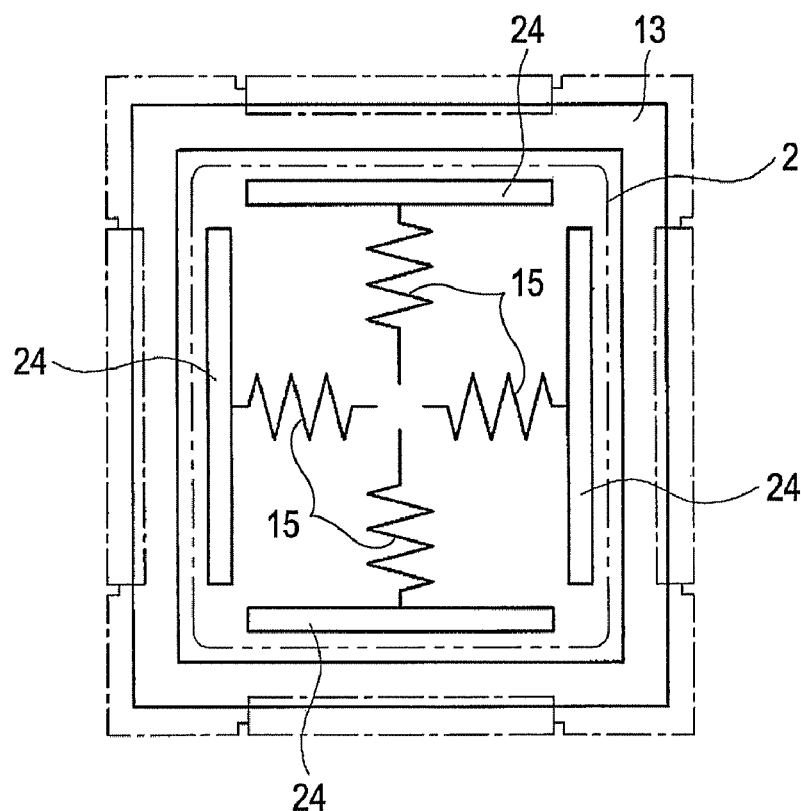
FIGS. 10A and 10B are plan views of a metal mold for use in a manufacturing method of a metal frame according to a comparative example.

Comparative Example of Method and Apparatus for Manufacturing Metal Frame for Electro-optical Device The metal frame for electro-optical device according to the present invention may be manufactured by a method and apparatus for manufacturing a metal frame for electro-optical device according to a comparative example described later. In the embodiments described above, in the side wall and corner portion forming step P2 in FIG. 3, the folding processing of the side walls 3 of FIG. 1A and the drawing processing of the corner portions 4 are performed at the same time. In the comparative example, the folding processing of the side walls 3 is performed first and the drawing processing of the corner portions 4 is performed later. For example, in the folding processing of the side walls 3, an inner metal mold, as shown in FIG. 10A, having linear movable molds 24 with no corner portions and the elastic force applying mechanism 15 is provided at a position corresponding to the bottom portion 2 (denoted by the chained line) of the metal frame 1, and the folding processing of the side walls 3 is performed in a state where the movable molds 24 are expanded to the expanded position while resisting against the elastic force by the elastic force applying mechanism 15. At this time, the positions of the movable molds 24 relative to the side walls 3 are at positions wherein they are in abutting contact with the inner circumferential surfaces of the side walls 3 as denoted by reference numeral 14b in FIG. 9B. In this manner, when the side walls 3 are formed by the folding processing using the linear movable molds 24, since the movable molds 24 are not present at locations corresponding to the corner portions 4 of the metal frame 1 of FIG. 1, even though the side walls 3 are formed, the corner portions 4 are not formed with a desired exact curved shape.

Figure 10B:
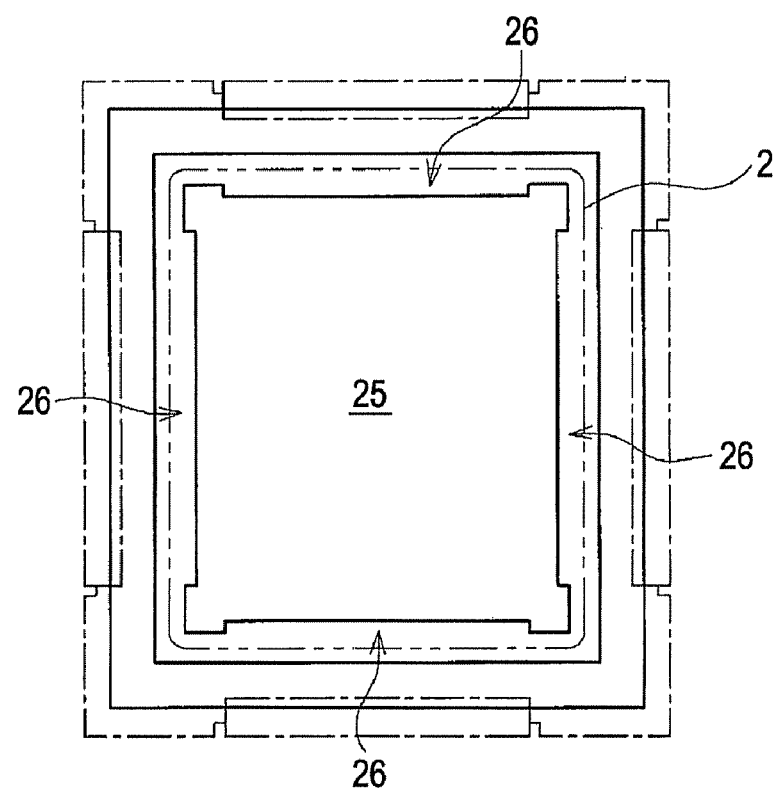

Next, the steel plate having the side walls 3 formed therein is conveyed for an another processing step, where the corner portions 4 of the metal frame 1 are formed by drawing processing in a state where an inner metal mold 25 as shown in FIG. 10B is provided at a position corresponding to the bottom portion 2 of the metal frame 1. In this way, the metal frame 1 as shown in FIG. 1A is obtained. Thereafter, the inner metal mold 25 is pulled out from the finished metal frame 1. Moreover, runout portions 26 are formed in circumferential surfaces on four sides of the inner metal mold 25 in such a shape as to be retracted inward. With the provision of the runout portions 26, the inner metal mold 25 can be freely advanced into and removed out of the metal frame 1 without interfering with the folding portions 5 (see FIG. 1A) of the side walls 3.

Like the comparative example, although the folding step for the side walls 3 and the drawing step for the corner portions 4 can be performed separately, if possible, it is desirable that the folding step for the side walls 3 and the drawing step for the corner portions 4 are performed simultaneously by using the slidable molds 14 having substantially L shape as shown in FIG. 8. By doing this, it is possible to decrease the number of processing machines and processing steps and to thus decrease the processing time.

Second Embodiment of Method and Apparatus for Manufacturing Metal Frame for Electro-optical Device Hereinafter, a method and apparatus for manufacturing a metal frame for electro-optical device according to another embodiment will be described.

Figure 11A:
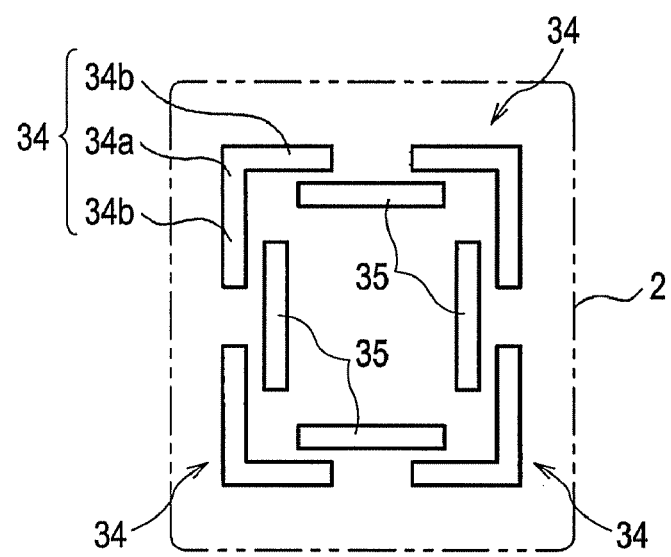
FIGS. 11A to 11C are plan views of a metal mold for use in a manufacturing method of a metal frame according to another embodiment of the present invention.
Figure 11B:
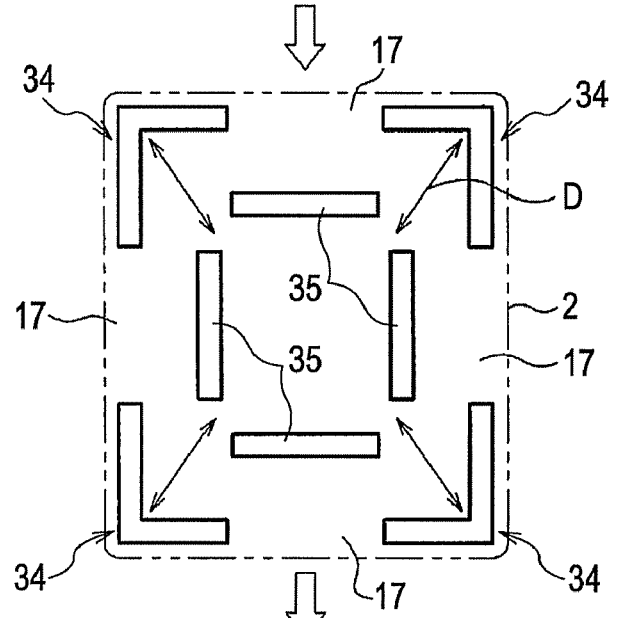
Figure 11C:
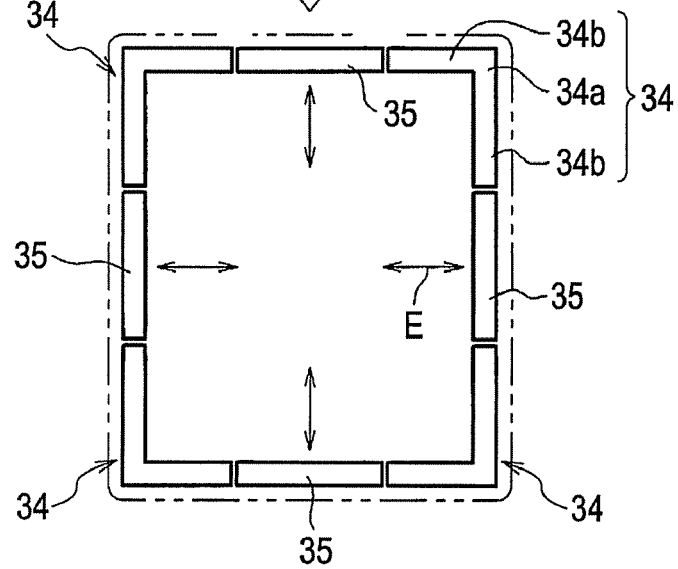

FIGS. 11A to 11C show the principal parts of the method and apparatus for manufacturing the metal frame for electro-optical device according to the present embodiment. In this manufacturing apparatus, the inner metal mold includes four movable molds 34 that are arranged on the diagonal lines of the metal frame 1 and four auxiliary metal molds 35 that are arranged at positions opposite the side walls 3 of the metal frame 1. Each of the movable molds 34 has a right-angled block shape and is formed by a middle portion 34a of which the outer circumferential surface has a shape conforming to the shape of the inner circumferential surfaces of the corner portions 4 of the metal frame 1 in FIG. 1A and a pair of branch portions 34b of the same length that extend in mutually perpendicular directions from the middle portion 34a. The auxiliary metal molds 35 are formed by linear blocks of appropriate lengths.

The movable molds 34 are configured to be movable in parallel directions, as denoted by the arrow D, between a contracted position as shown in FIG. 11A and an expanded position as shown in FIG. 11B. Similar to the embodiment shown in FIG. 8, the movable molds 34 are elastically biased in the contracting direction by an elastic force applying mechanism (not shown in FIGS. 11A to 11C) and can be expanded to the expanded position by a pressing member (not shown). The outer circumferential surfaces of the movable molds 34 at the expanded position are arranged along the outer edges of the bottom portion 2 of the metal frame. Meanwhile, the auxiliary metal molds 35 are configured to be movable in parallel directions, as denoted by the arrow E, between a contracted position as shown in FIGS. 11A and 11B and an expanded position as shown in FIG. 11C. Similar to the movable molds 34, the auxiliary metal molds 35 are elastically biased in the contracting direction by an elastic force applying mechanism (not shown) and can be expanded to the expanded position by a pressing member (not shown). The auxiliary metal molds 35 (see FIG. 11C) at the expanded position are in a state wherein they cover the spaces 17 between the branch portions 34b of the movable molds 34 at the expanded position in a substantially seamless manner.

In the manufacturing method of the present embodiment, similar to the embodiment shown in FIG. 3, the side wall and corner portion forming step P2 of FIG. 3 is performed on the steel plate 7 having the folding portions 5, as shown in FIGS. 5A to 5C, formed by the folding processing step P1, whereby the side walls 3 and the corner portions 4 shown in FIG. 1 are formed at the same time. Specifically, the movable molds 34 and the auxiliary metal molds 35 are placed on a corresponding portion on the surface of the bottom portion 2 of the metal frame in a state where the molds 34 and 35 are at the contracted state as shown in FIG. 11A. Next, the movable molds 34 are expanded to the expanded position as shown in FIG. 11B, and the auxiliary metal molds 35 are expanded to the expanded position as shown in FIG. 11C. The auxiliary metal molds 35 expanded to the expanded position are disposed such that they cover the spaces 17 formed between the branch portions 34b of the mutually adjacent movable molds 34. With this configuration, the outer circumferential surface of the inner metal mold forms a continuous and uniform surface with little discontinuity.

Next, an outer metal mold (not shown) is moved in parallel to the inner metal mold in a direction perpendicular to the sheet of FIG. 11. In this manner, by the cooperation of the inner metal mold 12 and the outer metal mold 13, the side walls 3 of FIG. 1 are formed by folding processing and at the same time, the corner portions 4 are formed by drawing processing. Next, as shown in FIGS. 11B and 11A, the auxiliary metal molds 35 are contracted toward the inner side, and the movable molds 34 are contracted toward the inner side. Subsequently, the inner metal mold is pulled out from the finished metal frame 1. At this time, since the movable molds 34 and the auxiliary metal molds 35 are preliminarily contracted toward the inner side, they do not collide with the folding portions 5 that are protruded inward. According to the present embodiment, since the auxiliary metal molds 35 are disposed between the mutually adjacent movable molds 34, there are no spaces present between the movable molds 34. For this reason, the side walls 3 do not have portions where the folding processing is insufficiently performed; therefore, the folding processing can be performed with uniformly high accuracy over the entire outer circumferential surfaces of the side walls 3. As a result, the side walls 3 can have a high strength against loads and bending over the entire areas of the side walls 3; therefore, it is possible to prevent partial degradation in strength of the side walls 3.

Embodiment of Electro-optical Device

Next, an electro-optical device according to one embodiment of the present invention will be described.

Figure 12:
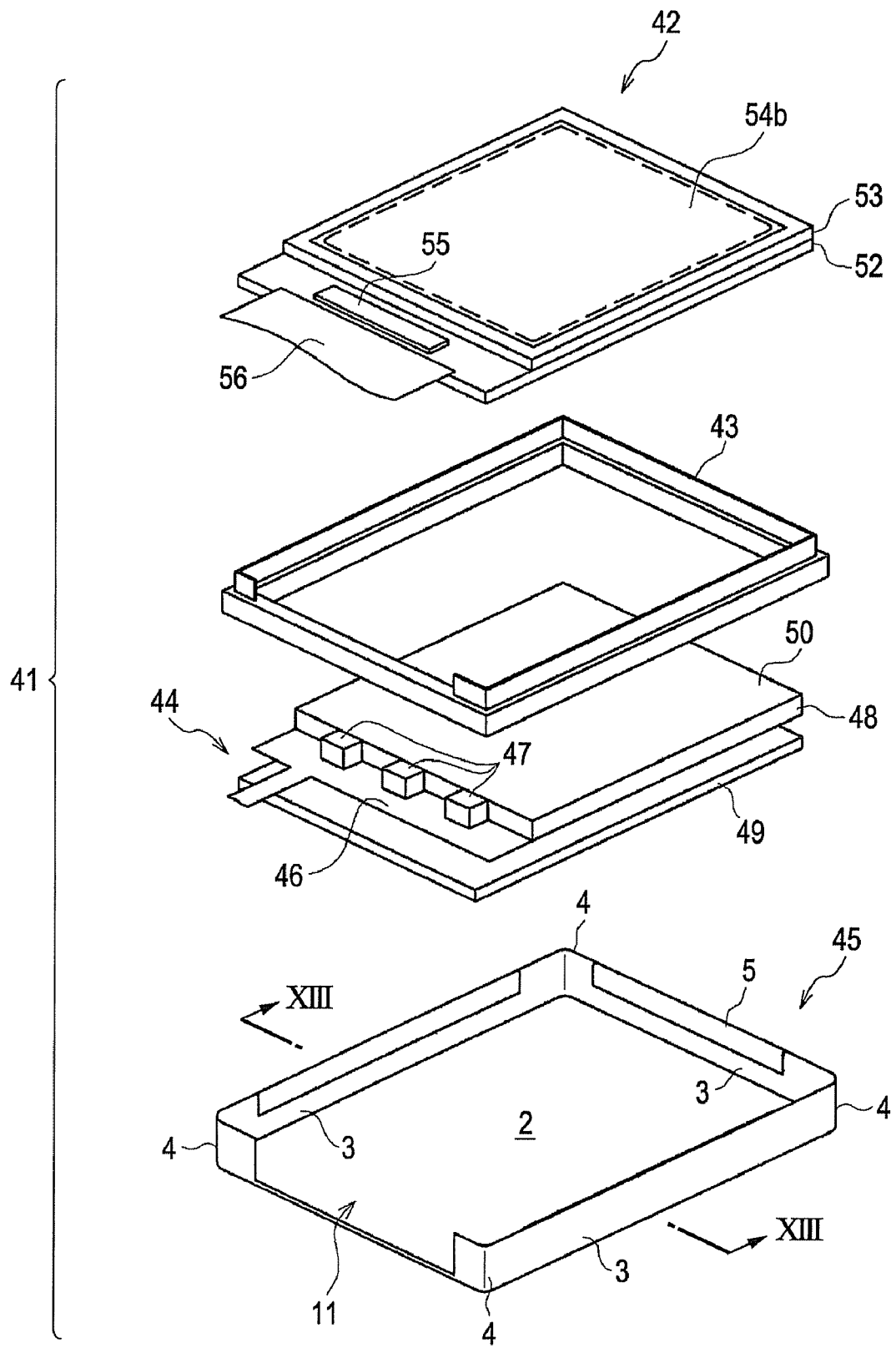
FIG. 12 is an exploded perspective view of a liquid crystal device which is an embodiment of the electro-optical device according to the present invention.
Figure 13:
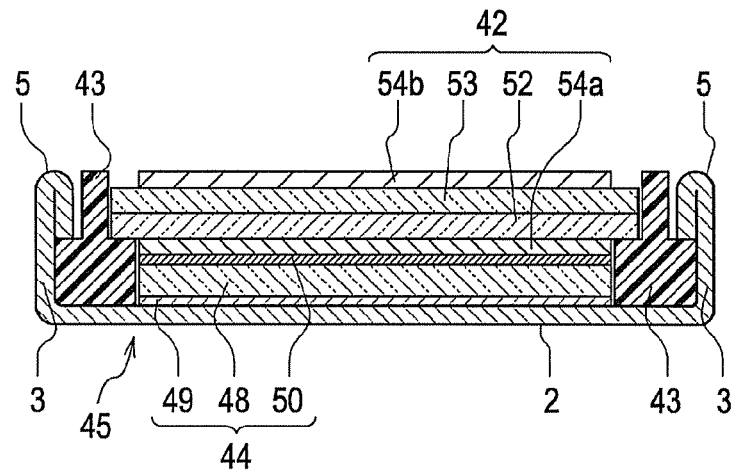
FIG. 13 is a side sectional view of the liquid crystal device shown in FIG. 12.

FIG. 12 is an exploded perspective view of the electro-optical device according to the present embodiment. FIG. 13 is a side sectional view of the electro-optical device in the assembled state, showing the structure taken along the XIII-XIII line in FIG. 12. The present embodiment illustrates the case where the present invention is applied to a liquid crystal device as the electro-optical device. It is to be noted that the present invention is not limited to the liquid crystal device having the illustrated construction and that the electro-optical device is not limited to the liquid crystal device. For example, the electro-optical device may be an organic EL device, or a plasma display device.

In FIG. 12, the liquid crystal device 41 includes a liquid crystal panel 42 as the electro-optical panel, a resin frame 43, an illumination unit 44, and a metal frame 45. The metal frame 45 is formed as the metal frame 21 shown in FIG. 2, that is, a metal frame in which the side wall 3 corresponding to the front shorter side of the bottom portion 2 is not provided with the folding portion 5 and has the cutout 11. Needless to say, the metal frame 45 may be formed as the metal frame 1 shown in FIGS. 1A and 1B. When describing the metal frame 45, the same components or elements will be denoted by the same reference numerals as FIGS. 1A and 1B, and redundant descriptions thereof will be omitted.

As shown in FIG. 13, the resin frame 43 is disposed at the inner side of the metal frame 45, the illumination unit 44 is incorporated under the resin frame 43, and the liquid crystal panel 42 is incorporated above the resin frame 43. The resin frame 43 is held (fixed) by the steps of the folding portions 5 of the metal frame 45.

Figure 14:
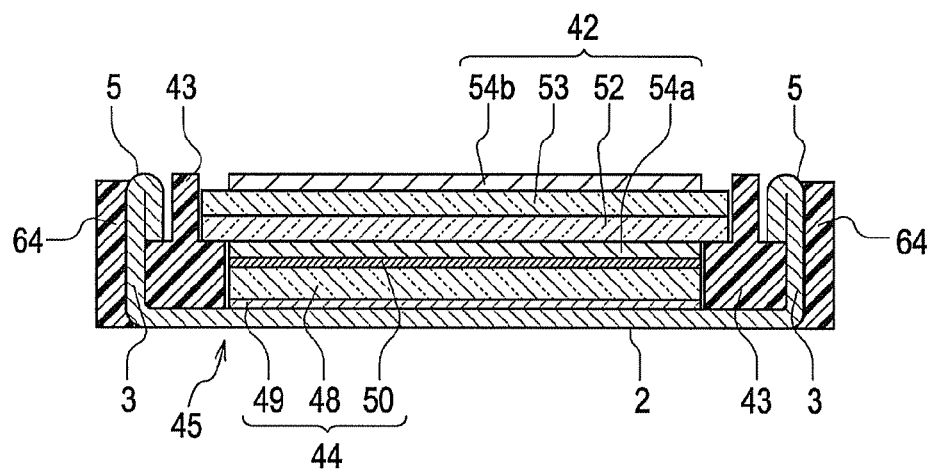
FIG. 14 is a side sectional view of the liquid crystal device shown in FIG. 12.

As shown in FIG. 14, another resin frame 64 may be additionally formed outside the side walls 3 of the metal frame 45. For example, the resin frame 43 and the resin frame 64 are integrally covering at least a portion of the side walls 3 of the metal frame 45. That is, at least a portion of the side walls 3 of the metal frame 45 is buried in between the resin frame 43 and the resin frame 64. In this manner, by forming the resin frame 64 outside the side walls 3 of the metal frame 45 in addition to the resin frame 43, it is possible to protect the metal frame 45 from external stress. That is, the strength of the metal frame 45 can be increased.

Figure 15:
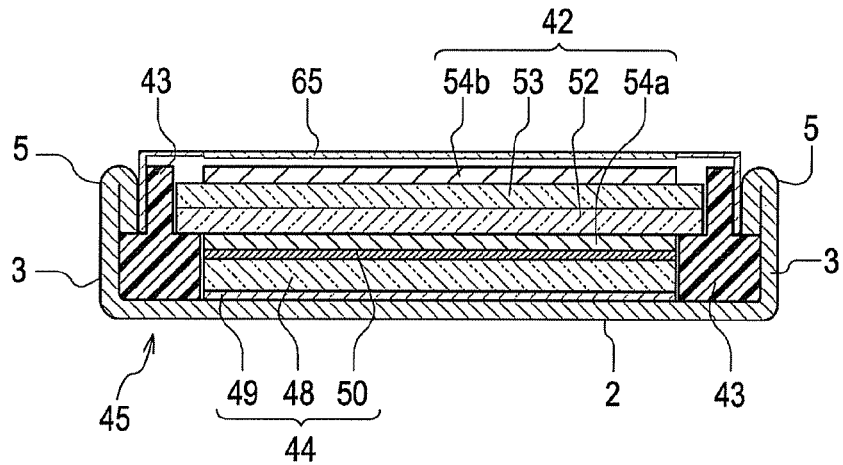
FIG. 15 is a side sectional view of the liquid crystal device shown in FIG. 12.

As shown in FIG. 15, an upper frame 65 made of metal or resin may be provided above the metal frame 45 such that opposite ends thereof are held (fixed) by being fitted between the folding portions 5 of the metal frame 45 and the resin frame 43.

As shown in FIG. 12, the illumination unit 44 includes an LED (light emitting diode) 47 as a light source mounted on the surface of an FPC 46 for LED use, a planar light guide 48 formed of transparent resin, a light reflecting sheet 49, and a light diffusing sheet 50. The LED 47 is driven by an external control circuit via the FPC 46 to perform lighting with desired intensity. A point-source emission from the LED 47 is guided through the side surfaces of the light guide 48 to the light guide 48 and projected as a field of light from a principal surface of the light guide 48 close to the liquid crystal panel 42, thereby illuminating the liquid crystal panel 42.

The liquid crystal panel 42 includes a pair of substrates 52 and 53. The substrates are formed, for example, of glass, and have a rectangular planar shape. The substrates are bonded to each other at inner peripheral regions thereof by means of sealing material such as epoxy-based resin. A cell gap of about 5 μm is formed between the substrates 52 and 53, and a liquid crystal as a light modulation element is enclosed in the cell gap. Polarization plates 54a and 54b are respectively adhered onto the outer surfaces of the substrates 52 and 53. The polarization transmission axes of the polarization plates 54a and 54b (see FIG. 13) cross each other at a predetermined angle. According to the needs, retardation plates may be installed between the polarization plates 54a and 54b and the substrates 52 and 53. Moreover, a driving IC 55 is mounted on a portion of the surface of the lower substrate 52 that is protruded outward than the upper substrate 53 by a COG (chip on glass) technique using an ACF (anisotropic conductive film). The driving IC 55 includes a scan line drive circuit, a data lien drive circuit, and other necessary circuits. An FPC 56 for LCD use is connected to a peripheral edge portion of the lower substrate 52 via an ACF, for example, and an RGB image signal or the like is transmitted to the driving IC 55 from an external control circuit via the LCD FPC 56.

The liquid crystal panel 42 is driven by an arbitrary liquid crystal driving method such as a passive matrix method or an active matrix method. Moreover, the liquid crystal panel 42 may be operated in an arbitrary mode selected from a TN (Twisted Nematic) mode, an STN (Super Twisted Nematic) mode, a VA (Vertical Aligned Nematic) mode, an ECB (Electrically Controlled Birefringence) mode, an IPS (In-Plane Switching) mode, and an FFS (Fringe Field Switching) mode. Moreover, the liquid crystal panel 42 may employ an arbitrary light capturing type such as a reflection type, a transmission type, or a transflective type. The transflective type is a type in which a portion of pixels is used as a reflection region while the remaining portion of the pixels is used as a transmission region so that the panel can be selectively used for the reflection type and the transmission type according to the needs. In the present embodiment, since the illumination unit 44 is used as a backlight, the transmission type or the transflective type is used as the light capturing method. In the case of employing the reflection type, the illumination unit 44 is not provided.

The passive matrix method is a matrix method in which active elements are not used in the pixels, intersections of scan electrodes and data electrodes correspond to the pixels or dots, and driving signals are directly applied to the pixels. Examples of an operation mode suitably used in the passive matrix method include a TN mode, an STN mode, a VA mode, and an ECB mode. The active matrix method is a matrix method in which active elements are formed for each pixel or dot, and during an address period, the active elements are turned on so that data voltages are addressed, while during other periods, the active elements are turned off so that the addressed voltages are sustained. Examples of an active element suitably used in the active matrix method include a three-terminal type element and a two-terminal type element. As the three-terminal type active element, a TFT (thin film transistor) can be exemplified. As the two-terminal type active element, a TFD (thin film diode) can be exemplified.

Figure 16:
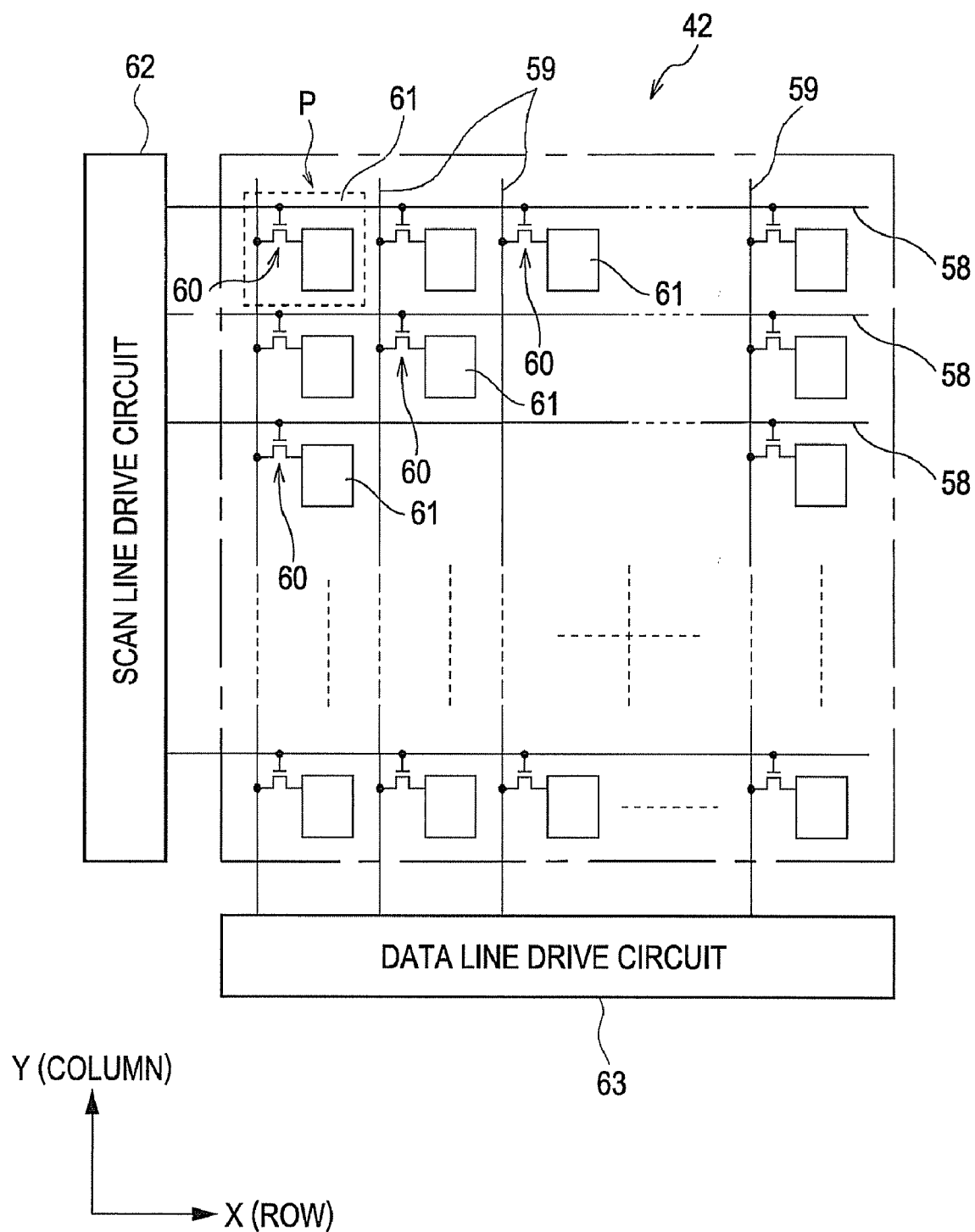
FIG. 16 is a diagram illustrating an electrical equivalent circuit of the liquid crystal device shown in FIG. 12.

FIG. 16 is a diagram illustrating an electrical equivalent circuit of the liquid crystal device in which an active matrix liquid crystal panel using TFT elements is used as the liquid crystal panel 42. In FIG. 16, a plurality of scan lines 58 extends in the row (X) direction, and a plurality of data lines 59 extends in the column (Y) direction perpendicular to the scan lines 58. The scan lines 58 and the data lines 59 are electrically isolated from each other via an insulating film. The scan lines 58 are connected to output terminals of a scan line drive circuit 62, and the data lines 59 are connected to output terminals of a data line drive circuit 63. The scan line drive circuit 62 and the data line drive circuit 63 are usually connected to a timing synchronization circuit (not shown) so that the operation timings are adjusted. The data line drive circuit 63 is supplied with image signals composed of three colors of R, G, and B, or four colors of R, G1, G2, and B (detailed description thereof will be provided later). The scan line drive circuit 62 and the data line drive circuit 63 are installed inside the driving IC 55 of FIG. 12.

Subpixels P serving as the minimum display units are formed in rectangular regions surrounded by the scan lines 58 and the data lines 59. Moreover, TFT elements 60 are installed in the individual subpixels P at the vicinity of the intersections of the scan lines 58 and the data lines 59. The scan lines are connected to the gate electrodes of the TFT elements 60, and the data lines 59 are connected to the source electrodes of the TFT elements 60. Island-shaped (dot-like) pixel electrodes 61 are disposed in the subpixels P and are formed from transparent conductive material such as ITO (indium tin oxide) or IZO (indium zinc oxide). The pixel electrodes 61 are connected to the drain electrodes of corresponding TFT elements 60.

Although not shown in the drawing, according to the needs, auxiliary capacitance may be provided to each subpixel P. The auxiliary capacitance is provided to prevent the capacitance associated to the pixel electrodes 61 from becoming too small. The auxiliary capacitance is formed by a first electrode that is formed of the same material and at the same layer as the gate electrodes of the TFT elements 60 so as to extend in a direction parallel to the scan lines 58, an insulating film covering the first electrode (the insulating film is usually formed from the gate insulating film of the TFT element), and a second electrode that is formed on the insulating film in the subpixels P at the same layer as the drain electrodes of the TFT elements 60.

The above-described structures related to the subpixels P are generally formed on the liquid crystal-side surface of the substrate 52 on which the driving IC 55 of FIG. 12 is mounted. Common electrodes made of ITO or IZO are formed on portions of the liquid crystal-side surface of the substrate 53 opposite the plurality of subpixels P. The common electrodes are electrically connected to the driving IC 55 via wiring patterns formed on the substrates 52 and 53 and a conductive member disposed between the substrate 52 and the substrate 53.

In order to realize a color display in the liquid crystal panel 42, a color filter is installed in one of the pair of substrates 52 and 53 (usually, the filter is formed in a substrate opposing the substrate having the TFT elements formed thereon). The color filter is formed by a plurality of coloring film capable of selectively transmitting light of a specific wavelength. For example, coloring films of three colors of B (blue), G (green), and R (red) are arranged in a predetermined array such as a strip array, a delta array, or a mosaic array so as to correspond to the subpixels on the substrate, thereby forming the color filter. In addition, the color filter may be configured with four coloring films including two more colors G (G1 and G2) in addition to the two colors of R and B. By using four coloring films, it is possible to broaden a color reproduction region on an NTSC ratio and to thus express with rich color tones.

In FIG. 16, when ON signals are transmitted to appropriate scan lines 58 and data signals are transmitted to appropriate data lines 59 in the scan lines, corresponding TFT elements 60 are turned on, whereby addressing is performed to the liquid crystals in the corresponding subpixels P. Subsequently, when the TFT elements 60 are turned off, the addressed states are sustained. By this series of address operations and sustain operations, the alignments of liquid crystal molecules are controlled, whereby polarized light passing through the liquid crystal layer is modulated.

In FIG. 12, the LED FPC 46 is connected to the LCD FPC 56 by means of a connector or soldering. The LCD FPC 56 is drawn out to the outside of the metal frame 45 through the side of the metal frame 45 where the side wall 3 is not provided and is connected to an external control circuit. In recent years, the liquid crystal device 41 is requested to be as thin as possible. To cope with such requests, the liquid crystal panel 42 of the present embodiment and the illumination unit 44 are made extremely thin. Therefore, the resin frame 43 and the metal frame 45 are also extremely thin. For example, the thickness (that is, the height of the side wall) of the metal frame 45 is extremely as small as about 1.2 mm. As the metal frame 45 becomes thinner, the strength of the metal frame 45 against loads and bending is decreased; therefore, there is a possibility that it is difficult to accomplish its function of protecting the liquid crystal panel 42, which is an electronic component accommodated therein. However, in the present embodiment, since the folding portions 5 are formed at the distal ends of the side walls 3 of the metal frame 45 and the corner portions 4 are formed at locations between the side walls 3 having the folding portions 5 by drawing processing, the metal frame 45 can have a sufficient mechanical strength. Accordingly, it is possible to protect the liquid crystal panel 42 in a secure manner.

Embodiment of Manufacturing Method of
Electro-optical Device

Next, a method for manufacturing the electro-optical device shown in FIG. 12 will be described.

Figure 17:
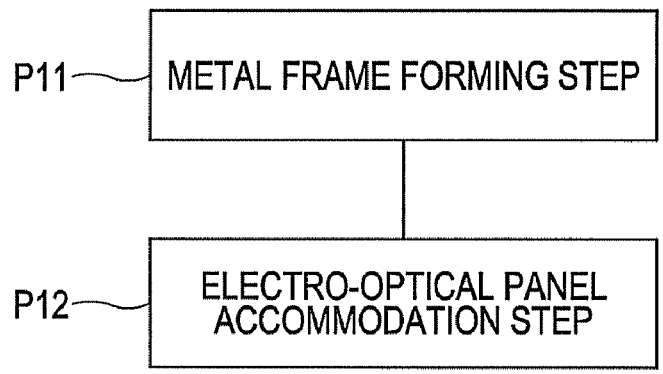
FIG. 17 is a diagram showing the process steps of a manufacturing method of the electro-optical device according to one embodiment of the present invention.

FIG. 17 is a diagram showing the process steps of the manufacturing method of the electro-optical device according to the present embodiment. The present embodiment illustrates the case where the present invention is applied to the manufacturing method of a liquid crystal device as an example of the manufacturing method of the electro-optical device. It is to be noted that the present invention is not limited to the manufacturing method of the liquid crystal device having the illustrated construction, and that the manufacturing method of the electro-optical device is not limited to the manufacturing method of the liquid crystal device.

In FIG. 17, the liquid crystal device 41 used for describing the manufacturing method of the present embodiment includes a liquid crystal panel 42 as the electro-optical panel, a resin frame 43, an illumination unit 44, and a metal frame 45. The manufacturing method of the liquid crystal device 41 includes a metal frame forming step P11 for forming the metal frame 45 that includes a plurality of side walls 3 and corner portions 4 provided between the side walls 3 and an electro-optical panel accommodation step P12 for accommodating the liquid crystal panel 42 in the metal frame 45. The metal frame forming step P11 includes a folding processing step P1 and subsequently a side wall and corner portion forming step P2, as shown in FIG. 3. The metal frame 45 is formed as the metal frame 21 shown in FIG. 2, that is, a metal frame in which the side wall 3 corresponding to the front shorter side of the bottom portion 2 is not provided with the folding portion 5 and has the cutout 11. Needless to say, the metal frame 45 may be formed as the metal frame 1 shown in FIGS. 1A and 1B. When describing the metal frame 45, the same components or elements will be denoted by the same reference numerals as FIGS. 1A and 1B, and redundant descriptions thereof will be omitted.

In the electro-optical panel accommodation step P12, as shown in FIG. 13, the resin frame 43 is disposed at the inner side of the metal frame 45, the illumination unit 44 is incorporated under the resin frame 43, and the liquid crystal panel 42 is incorporated above the resin frame 43. The resin frame 43 is held (fixed) by the steps of the folding portions 5 of the metal frame 45.

The metal frame 45 and the resin frame 43 may formed by insert molding. For example, the metal frame 45 as an insert component is disposed inside a metal mold, and thereafter, resin is filled into a cavity disposed to surround the inner circumference of the metal frame 45, thereby integrally forming the metal frame 45 and the resin frame 43 as insert molded products.

As described above, according to the present embodiment, it is possible to manufacture with high accuracy the electro-optical device having the metal frame 1 shown in FIG. 1A, that is, the metal frame 1 that includes the folding portions 5 at the distal ends of the side walls 3 and the corner portions 4 formed between the mutually adjacent side walls 3 by drawing processing.

Electronic Apparatus

Figure 18:
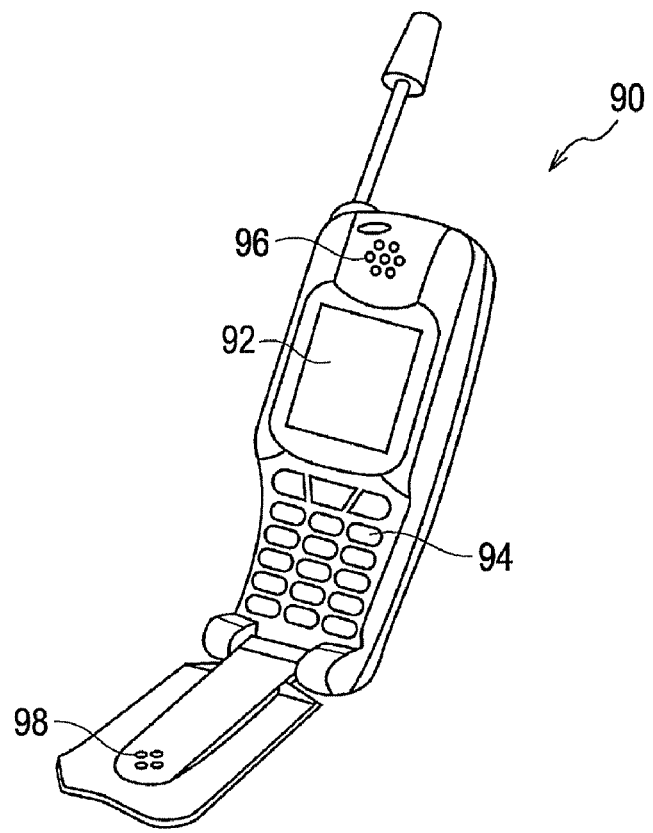
FIG. 18 is a perspective view showing an example of an electronic apparatus according to the present invention.

FIG. 18 is a perspective view illustrating an example of an electronic apparatus according to the present embodiment. The cellular phone 90 shown in FIG. 18 includes a small-sized display portion 92 as the liquid crystal device 41 of the embodiment described above, a plurality of operation buttons 94, an ear piece 96, and a mouth piece 98. Moreover, since the metal frame according to the present embodiment has the folding portions at the distal end portions of the side walls, it is possible to increase the strength of the side walls. Moreover, since the side walls having the folding portion are connected in a seamless curved shape, the metal frame can have a strength corresponding to the combined strengths of the folding portions, and the strength of the metal frame can be extremely increased. For this reason, the metal frame can maintain a sufficient mechanical strength even when the thickness is decreased. Therefore, since the electronic apparatus having the metal frame for electro-optical device according to the invention has a high strength despite its small thickness, even when the electro-optical panel of the liquid crystal device 41 is thin, it is possible to protect the electro-optical panel from external stress or mechanical load by the metal frame.

The liquid crystal device 41 according to the present embodiment is not limited to the cellular phone 90. The liquid crystal device 41 may be suitably used as image display means of an electronic book, a personal computer, a digital-still camera, a liquid crystal television, a view finder type or monitor direct vision-type video tape recorder, a car navigation apparatus, a pager, an electronic pocket book, a calculator, a word processor, a work station, a television phone, a POS terminal, an apparatus having a touch panel, a 3-D liquid crystal display apparatus using a field-sequential (FS) display method, a dual-screen liquid crystal display apparatus, and a projection TV-specific light valve. In either of the electronic apparatuses, it is possible to realize fast-response display with reduced response relaxation time by using the transmission display and the reflection display.

Other Embodiments

Although the exemplary embodiments of the invention have been described with reference to the accompanying drawings, it should be understood that the invention is not limited to such embodiments. Various changes may be made depending on design requirements or the like without departing from the spirit or scope of the invention.

For example, the metal frame may be used not only for accommodation of the liquid crystal panel but also for accommodation of other electro-optical panels other than the liquid crystal panel, for example, a flat display panel such as an organic EL panel or a plasma display panel. In addition, the metal frame may be used for accommodation of an electronic component other than the flat display panel.

In the embodiment shown in FIG. 12, the metal frame 45 is provided at the back side of the display unit including the liquid crystal panel 42 and the illumination unit 44. Instead of this, the metal frame 45 may be provided at the front side of the display unit, that is, at the image display side of the liquid crystal panel 42. In this case, it is necessary to form an opening in a portion of the bottom surface of the metal frame 45 so that the image display region of the liquid crystal panel 42 can be observed through the opening. In the embodiment shown in FIG. 12, the metal frame 45 is provided at one surface of the display unit. However, the metal frame may be provided at either or both of the surfaces of the display unit. In this case, fitting structures may be provided both of the metal frames so that both metal frames can be coupled with each other by means of the fitting structures. In addition, in order to couple the pair of metal frames, it is necessary to provide an opening to the metal frame disposed at the image display side of the liquid crystal panel 42 so that the image display region of the liquid crystal panel 42 can be observed through the opening.

In the embodiments described above, the folding portions 5 are provided to all or three of the four side walls 3, and in the case where the folding portions 5 are provided to three side walls 3, the folding portion 5 is not provided to the remaining side wall 3 and the cutout 11 is provided at the middle portion of the remaining side wall 3. Instead of this, the folding portion may be provided to at least one of the side walls 3. In such a case, the small notch portion 6 shown in FIGS. 1A and 1B is not provided to the side wall 3 with no folding portion 5. Moreover, the height of the side wall 3 with no folding portion 5 as measured from the bottom surface (the rear surface in the drawing) of the bottom portion 2 may be set lower or higher than the height of the side walls 3 with the folding portions 5. Furthermore, the folding portion 5 may be provided to at least a portion of one side wall 3 rather than being provided at the entire portions of the side wall 3.

In the embodiment shown in FIG. 2, a relatively wide cutout 11 is provided on one shorter side of the bottom portion 2 of the metal frame 21. The depth of the cutout 11 is substantially identical to the height of the side wall 3. Instead of this, the cutout 11 may have a smaller width. In such a case, the side walls 3 with no folding portion 5 extend to the corner portions 4 at both sides of the cutout 11. Moreover, the depth of the cutout 11 may be smaller than the height of the side walls 3. In such a case, the side wall 3 on the side having the cutout 11 formed therein has a height smaller than that of the side walls 3 on other sides.

In the embodiments described above, the folding portions 5 have a hemming structure that is a bent structure formed by folding the portions so that the inner surfaces are in mutual contact. However, the present invention is not limited to this and the folding portions 5 may have a bent structure wherein they are folded so that the inner surfaces are not in contact with each other but opposed to each other.

Figure 19A:
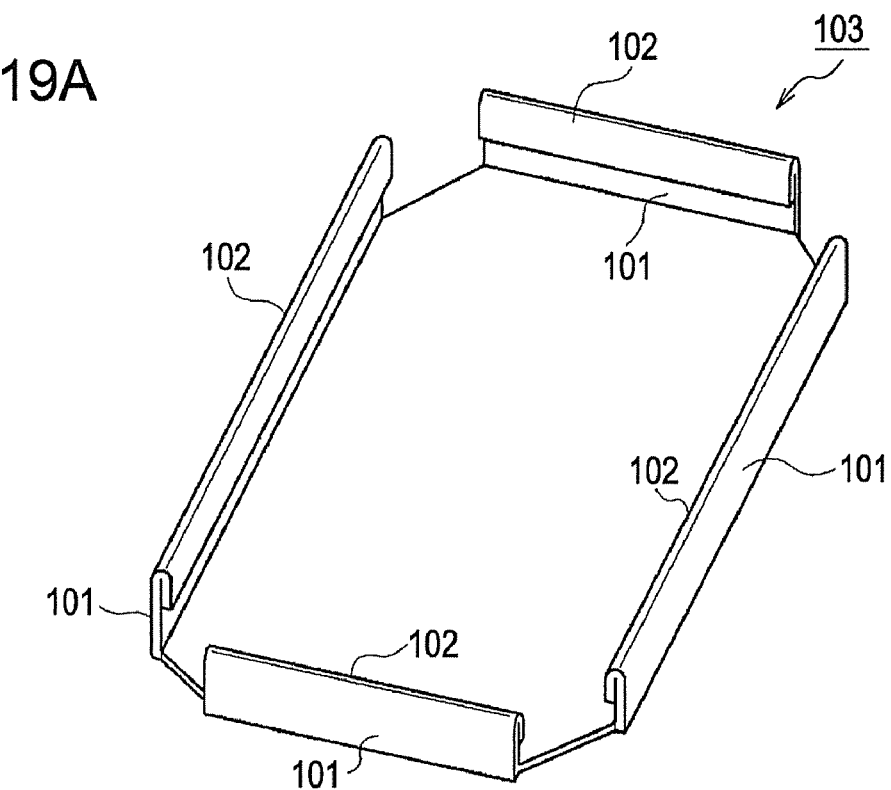
FIGS. 19A and 19B are perspective views of the metal frame according to the comparative example.
Figure 19B:
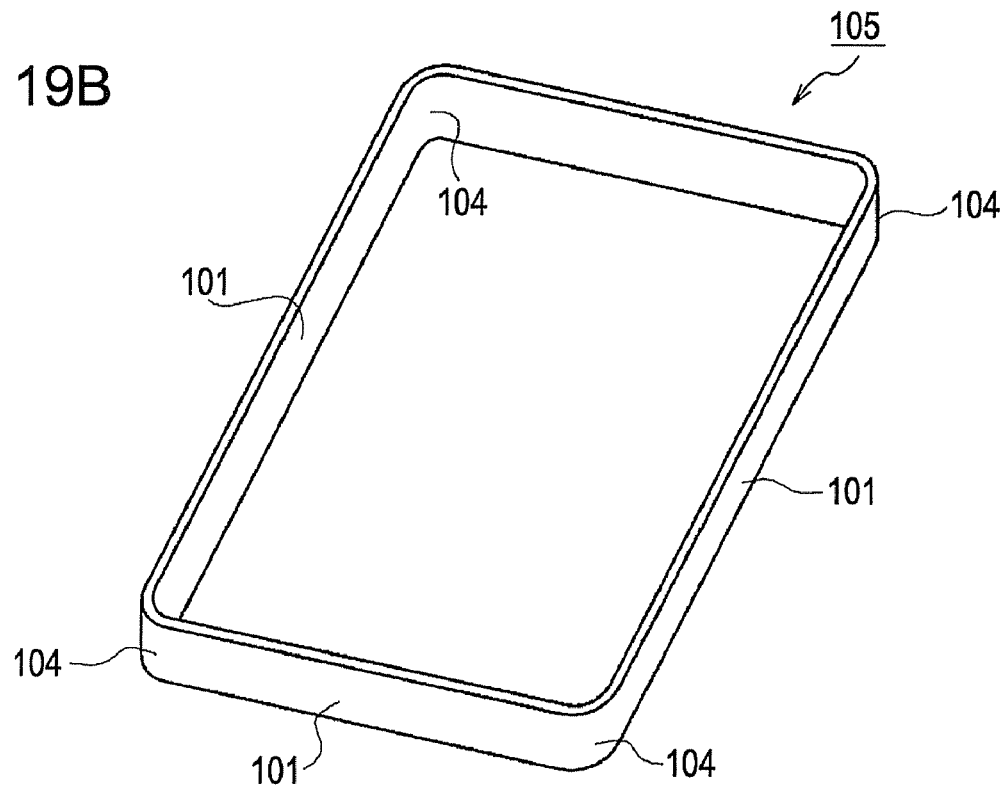

FIGS. 19A and 19B are diagrams showing metal frames according to comparative examples. FIG. 19A shows a metal frame 103 having hemming structures 102 at the distal ends of the side walls 101. FIG. 19B shows a metal frame 105 having corner portions 104 between side walls 101 but not having such hemming structures at the distal ends of the side walls 101. In the metal frame shown in FIG. 19A, since the corner portions were weakly reinforced, deformation was occurred in the diagonal direction of the metal frame. In the structure of FIG. 19B, since the side walls have a small height and the hemming structure is not employed, deformation was occurred in the longitudinal or horizontal direction of the metal frame. Either of the structures shown in FIGS. 19A and 19B was weaker in strength than the metal frame according to the embodiments of the present invention, and the structures according to the comparative examples were not sufficient as the metal frame for electro-optical device.

The entire disclosure of Japanese Patent Application Nos: 2007-170075, field Jun. 28, 2007 and 2008-126289, field May 13, 2008 are expressly incorporated by reference herein.

What is claimed is:

1. An electro-optical device, comprising:
an electro-optical panel; and
a metal frame formed from planar metal and configured to accommodate the electro-optical panel therein,
wherein the metal frame comprises a bottom portion, a plurality of side walls and a plurality of raised corner portions provided between the side walls,
wherein the side walls and the corner portions extend outward from the bottom portion in a transverse direction,
wherein a distal end of at least a portion of at least one of the side walls has a folding portion having a structure that inner surfaces are opposed to each other, and
wherein at least one of the corner portions is seamlessly joined to the at least one of the side walls having the folding portion and has a seamless curved shape.

2. The electro-optical device according to claim 1, wherein the at least one of the corner portions is formed by drawing processing of the planar metal.

3. The electro-optical device according to claim 1,
wherein the bottom portion is oblong in plan view, and
wherein the side walls are formed on four sides of the bottom portion.

4. The electro-optical device according to claim 3, wherein the corner portions of the metal frame are formed at four locations between the side walls formed on the four sides, and wherein each of the corner portions formed at the four locations is seamlessly joined to at least an adjacent one of the side walls.

5. The electro-optical device according to claim 1,
wherein the bottom portion is oblong in plan view,
wherein the plurality of side walls are formed on four sides of the bottom portion,
wherein the side walls on at least three sides of the four sides have the folding portion,
wherein the side wall on at least one side of the four sides has a cutout in a middle portion thereof,
wherein the corner portions are formed at four locations between the side walls formed on the four sides, and
wherein each of the corner portions is seamlessly joined to at least one of the side walls having the folding portion.

6. The electro-optical device according to claim 1, wherein the metal frame includes a cutout portion at a distal end of a side wall disposed between the folding portion and the at least one of the corner portions.

7. The electro-optical device according to claim 1, wherein the folding portion has its inner surfaces which are in mutual contact.

8. An electronic apparatus comprising the electro-optical device according to claim 1.

* * * * *